(12) United States Patent
Yamamoto et al.

(10) Patent No.: US 12,283,657 B2
(45) Date of Patent: Apr. 22, 2025

(54) PRECURSOR SOLUTION OF GARNET-TYPE SOLID ELECTROLYTE, METHOD FOR PRODUCING PRECURSOR SOLUTION OF GARNET-TYPE SOLID ELECTROLYTE, AND GARNET-TYPE SOLID ELECTROLYTE

(71) Applicant: Seiko Epson Corporation, Tokyo (JP)

(72) Inventors: Hitoshi Yamamoto, Chino (JP); Tomofumi Yokoyama, Matsumoto (JP); Tsutomu Teraoka, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 760 days.

(21) Appl. No.: 17/438,540

(22) PCT Filed: Nov. 21, 2019

(86) PCT No.: PCT/JP2019/045709
§ 371 (c)(1),
(2) Date: Sep. 13, 2021

(87) PCT Pub. No.: WO2020/183806
PCT Pub. Date: Sep. 17, 2020

(65) Prior Publication Data
US 2022/0158228 A1 May 19, 2022

(30) Foreign Application Priority Data
Mar. 14, 2019 (JP) .................. 2019-046840

(51) Int. Cl.
*H01M 10/0562* (2010.01)
*H01M 10/0525* (2010.01)

(52) U.S. Cl.
CPC .... *H01M 10/0562* (2013.01); *H01M 10/0525* (2013.01); *H01M 2300/0077* (2013.01)

(58) Field of Classification Search
CPC .............. H01M 10/0525; H01M 10/0562
See application file for complete search history.

(56) References Cited

U.S. PATENT DOCUMENTS

| 2016/0093915 A1 | 3/2016 | Yamamoto et al. |
| 2018/0062200 A1 | 3/2018 | Yamamoto et al. |
| (Continued) | | |

FOREIGN PATENT DOCUMENTS

| CN | 1528028 A | 9/2004 |
| CN | 109119684 A | 1/2019 |
| (Continued) | | |

OTHER PUBLICATIONS

International Search Report (English and Japanese) of the International Searching Authority issued in PCT/JP2019/045709, mailed Feb. 10, 2020; ISA/JP (5 pages).

*Primary Examiner* — Karie O'Neill Apicella
(74) *Attorney, Agent, or Firm* — Harness, Dickey & Pierce, P.L.C.

(57) ABSTRACT

A precursor solution of a garnet-type solid electrolyte is provided that is represented by the following compositional formula, and contains one type of solvent, and a lithium compound, a lanthanum compound, a zirconium compound, a gallium compound, and a neodymium compound, each of which has solubility in the solvent, wherein with respect to the stoichiometric composition of the following compositional formula, the amount of the lithium compound is 1.05 times or more and 1.30 times or less, and the amounts of the lanthanum compound, the zirconium compound, the gallium compound, and the neodymium compound are equal, $$(Li_{7-3x}Ga_x)(La_{3-y}Nd_y)Zr_2O_{12}$$

provided that the following relationships are satisfied: $0.1 \leq x \leq 1.0$ and $0.0 < y \leq 0.2$.

8 Claims, 9 Drawing Sheets

(56) References Cited

U.S. PATENT DOCUMENTS

| 2018/0375150 | A1 | 12/2018 | Yamamoto et al. |
| 2019/0084887 | A1 | 3/2019 | Yamamoto et al. |
| 2019/0260068 | A1* | 8/2019 | Yamamoto ........ H01M 10/0562 |

FOREIGN PATENT DOCUMENTS

| JP | 2016-72210 A | 5/2016 |
| JP | 2017-168396 A | 9/2017 |
| JP | 2018-037325 A | 3/2018 |
| WO | 2002-078114 A1 | 10/2002 |

* cited by examiner

FIG. 6D

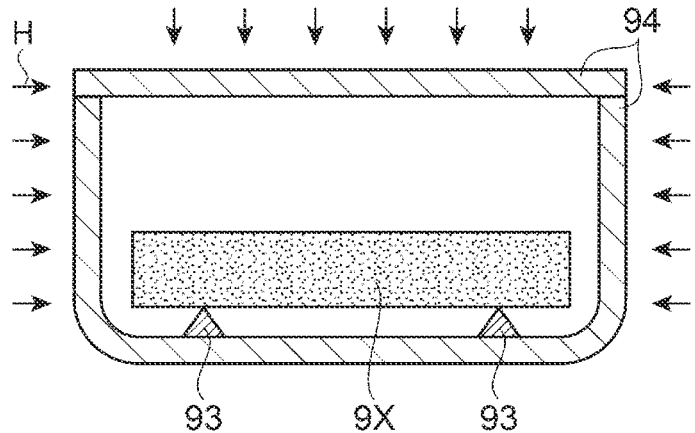

FIG. 7

| | COMPOSITION OF SOLID ELECTROLYTE | SYNTHESIS METHOD | x | y | MOISTURE AMOUNT [ppm] | SECOND HEATING TREATMENT CONDITIONS |
|---|---|---|---|---|---|---|
| EXAMPLE 1 | $(Li_{5.5}Ga_{0.5})(La_{2.95}Nd_{0.05})Zr_2O_{12}$ | LIQUID-PHASE METHOD | 0.50 | 0.05 | 7 | 1,000°C×8H |
| EXAMPLE 2 | $(Li_{4.3}Ga_{0.9})(La_{2.98}Nd_{0.02})Zr_2O_{12}$ | LIQUID-PHASE METHOD | 0.90 | 0.02 | 10 | 1,000°C×8H |
| EXAMPLE 3 | $(Li_{6.4}Ga_{0.2})(La_{2.85}Nd_{0.15})Zr_2O_{12}$ | LIQUID-PHASE METHOD | 0.20 | 0.15 | 8 | 1,000°C×8H |
| EXAMPLE 4 | $(Li_{5.5}Ga_{0.5})(La_{2.96}Nd_{0.04})Zr_2O_{12}$ | LIQUID-PHASE METHOD | 0.50 | 0.04 | 6 | 1,000°C×8H |
| EXAMPLE 5 | $(Li_{5.55}Ga_{0.5})(La_{2.95}Ca_{0.05})Zr_2O_{12}$ | LIQUID-PHASE METHOD | 0.50 | 0.05 | 10 | 1,000°C×8H |
| EXAMPLE 6 | $(Li_{4.32}Ga_{0.9})(La_{2.98}Ca_{0.02})Zr_2O_{12}$ | LIQUID-PHASE METHOD | 0.90 | 0.02 | 8 | 1,000°C×8H |
| EXAMPLE 7 | $(Li_{6.55}Ga_{0.2})(La_{2.85}Ca_{0.15})Zr_2O_{12}$ | LIQUID-PHASE METHOD | 0.20 | 0.15 | 7 | 1,000°C×8H |
| EXAMPLE 8 | $(Li_{5.5}Ga_{0.5})(La_{2.96}Ca_{0.04})Zr_2O_{12}$ | LIQUID-PHASE METHOD | 0.50 | 0.04 | 9 | 1,000°C×8H |
| COMPARATIVE EXAMPLE 1 | $(Li_{5.5}Ga_{0.5})(La_{2.95}Nd_{0.05})Zr_2O_{12}$ | SOLID-PHASE METHOD | — | — | — | 1,000°C×8H |
| COMPARATIVE EXAMPLE 2 | $(Li_{5.55}Ga_{0.5})(La_{2.95}Ca_{0.05})Zr_2O_{12}$ | SOLID-PHASE METHOD | — | — | — | 1,000°C×8H |
| COMPARATIVE EXAMPLE 3 | $(Li_{5.5}Ga_{0.5})(La_{2.95}Nd_{0.05})Zr_2O_{12}$ | LIQUID-PHASE METHOD | — | — | 14 | 1,000°C×8H |
| COMPARATIVE EXAMPLE 4 | $(Li_{5.55}Ga_{0.5})(La_{2.95}Ca_{0.05})Zr_2O_{12}$ | LIQUID-PHASE METHOD | — | — | 200 | 1,000°C×8H |
| COMPARATIVE EXAMPLE 5 | $(Li_{5.5}Ga_{0.5})(La_{2.95}Nd_{0.05})Zr_2O_{12}$ | LIQUID-PHASE METHOD | 0.50 | 0.05 | 8 | 1,000°C×8H |
| COMPARATIVE EXAMPLE 6 | $(Li_{5.55}Ga_{0.5})(La_{2.95}Ca_{0.05})Zr_2O_{12}$ | LIQUID-PHASE METHOD | 0.50 | 0.05 | 9 | 1,000°C×8H |

FIG. 8

| | | CRYSTAL SYSTEM | LITHIUM ION CONDUCTIVITY [S·cm⁻¹] | | |
|---|---|---|---|---|---|
| | | | GRAIN BULK CONDUCTIVITY | GRAIN BOUNDARY CONDUCTIVITY | TOTAL ION CONDUCTIVITY |
| EXAMPLE 1 | $(Li_{5.5}Ga_{0.5})(La_{2.95}Nd_{0.05})Zr_2O_{12}$ | c | $9.2 \times 10^{-3}$ | $5.7 \times 10^{-3}$ | $3.5 \times 10^{-3}$ |
| EXAMPLE 2 | $(Li_{4.3}Ga_{0.9})(La_{2.98}Nd_{0.02})Zr_2O_{12}$ | c | $7.1 \times 10^{-3}$ | $3.2 \times 10^{-3}$ | $2.2 \times 10^{-3}$ |
| EXAMPLE 3 | $(Li_{6.4}Ga_{0.2})(La_{2.85}Nd_{0.15})Zr_2O_{12}$ | c | $6.9 \times 10^{-3}$ | $3.0 \times 10^{-3}$ | $2.1 \times 10^{-3}$ |
| EXAMPLE 4 | $(Li_{5.5}Ga_{0.5})(La_{2.96}Nd_{0.04})Zr_2O_{12}$ | c | $9.1 \times 10^{-3}$ | $5.6 \times 10^{-3}$ | $3.5 \times 10^{-3}$ |
| EXAMPLE 5 | $(Li_{5.55}Ga_{0.5})(La_{2.95}Ca_{0.05})Zr_2O_{12}$ | c | $9.2 \times 10^{-3}$ | $2.0 \times 10^{-3}$ | $1.6 \times 10^{-3}$ |
| EXAMPLE 6 | $(Li_{4.32}Ga_{0.9})(La_{2.98}Ca_{0.02})Zr_2O_{12}$ | c | $7.1 \times 10^{-3}$ | $1.5 \times 10^{-3}$ | $1.2 \times 10^{-3}$ |
| EXAMPLE 7 | $(Li_{6.55}Ga_{0.2})(La_{2.85}Ca_{0.15})Zr_2O_{12}$ | c | $6.9 \times 10^{-3}$ | $1.3 \times 10^{-3}$ | $1.1 \times 10^{-3}$ |
| EXAMPLE 8 | $(Li_{5.5}Ga_{0.5})(La_{2.96}Nd_{0.04})Zr_2O_{12}$ | c | $9.1 \times 10^{-3}$ | $1.9 \times 10^{-3}$ | $1.6 \times 10^{-3}$ |
| COMPARATIVE EXAMPLE 1 | $(Li_{5.5}Ga_{0.5})(La_{2.95}Nd_{0.05})Zr_2O_{12}$ | t+c | $1.5 \times 10^{-4}$ | $3.0 \times 10^{-4}$ | $1.0 \times 10^{-4}$ |
| COMPARATIVE EXAMPLE 2 | $(Li_{5.55}Ga_{0.5})(La_{2.95}Ca_{0.05})Zr_2O_{12}$ | t+c | $1.5 \times 10^{-4}$ | $9.0 \times 10^{-5}$ | $5.6 \times 10^{-5}$ |
| COMPARATIVE EXAMPLE 3 | $(Li_{5.5}Ga_{0.5})(La_{2.95}Nd_{0.05})Zr_2O_{12}$ | c | $1.0 \times 10^{-3}$ | $1.1 \times 10^{-4}$ | $1.0 \times 10^{-4}$ |
| COMPARATIVE EXAMPLE 4 | $(Li_{5.55}Ga_{0.5})(La_{2.95}Ca_{0.05})Zr_2O_{12}$ | c | $1.0 \times 10^{-3}$ | $9.0 \times 10^{-5}$ | $8.3 \times 10^{-5}$ |
| COMPARATIVE EXAMPLE 5 | $(Li_{5.5}Ga_{0.5})(La_{2.95}Nd_{0.05})Zr_2O_{12}$ | c | $1.5 \times 10^{-4}$ | $3.0 \times 10^{-4}$ | $1.0 \times 10^{-4}$ |
| COMPARATIVE EXAMPLE 6 | $(Li_{5.55}Ga_{0.5})(La_{2.95}Ca_{0.05})Zr_2O_{12}$ | c | $1.5 \times 10^{-4}$ | $9.0 \times 10^{-5}$ | $5.8 \times 10^{-5}$ |

PRECURSOR SOLUTION OF GARNET-TYPE SOLID ELECTROLYTE, METHOD FOR PRODUCING PRECURSOR SOLUTION OF GARNET-TYPE SOLID ELECTROLYTE, AND GARNET-TYPE SOLID ELECTROLYTE

CROSS REFERENCE TO RELATED APPLICATIONS

The present application is based on International Application No. PCT/JP2019/045709, filed on Nov. 21, 2019, and claims priority from JP Application Serial Number 2019-046840, filed on Mar. 14, 2019, the disclosure of which is hereby incorporated by reference herein in its entirety.

BACKGROUND

Technical Field

The present invention relates to a precursor solution of a garnet-type solid electrolyte, a method for producing a precursor solution of a garnet-type solid electrolyte, and a garnet-type solid electrolyte.

Related Art

Heretofore, a garnet-type solid electrolyte has been known as an inorganic electrolyte used in a lithium-ion battery. For example, JP-A-2017-168396 proposes a solid electrolyte containing a first electrolyte which is a garnet-type or garnet-like crystalline material.

However, the solid electrolyte described in JP-A-2017-168396 had a problem that the lithium ion conduction property may decrease. More particularly, a solid electrolyte precursor solution is prepared by mixing multiple types of metal compound solutions. Different types of organic solvents such as butanol, 2-n-butoxyethanol, and ethanol are used for each of the metal compound solutions. That is, such organic solvents exist in a mixed state in the solid electrolyte precursor solution. In addition, the multiple types of metal compounds contained in the solid electrolyte precursor solution sometimes have different solubilities in such organic solvents. As a result, when the solid electrolyte precursor solution is subjected to solvent drying, evaporation starts from the organic solvent having a low boiling point. Therefore, deposition easily proceeds starting from the metal contained in the metal compound solution using the organic solvent having a low boiling point. That is, in a step of synthesizing the solid electrolyte, there was a fear that the multiple metals constituting the solid electrolyte become less likely to be uniformly deposited. There was a possibility that if the multiple metals are not uniformly deposited, a byproduct is generated or a non-uniform region occurs inside the solid electrolyte, and the lithium ion conduction property decreases.

SUMMARY

A precursor solution of a garnet-type solid electrolyte of this application is a precursor solution of a garnet-type solid electrolyte represented by the following compositional formula, and contains one type of solvent, and a lithium compound, a lanthanum compound, a zirconium compound, a gallium compound, and a neodymium compound, each of which has solubility in the solvent, wherein with respect to the stoichiometric composition of the following compositional formula, the amount of the lithium compound is 1.05 times or more and 1.30 times or less, and the amounts of the lanthanum compound, the zirconium compound, the gallium compound, and the neodymium compound are equal.

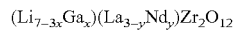

Provided that the following relationships are satisfied: $0.1 \leq x \leq 1.0$ and $0.0 < y \leq 0.2$.

In the precursor solution of a garnet-type solid electrolyte described above, it is preferred that the zirconium compound is a zirconium alkoxide, the lithium compound is a lithium metal salt compound, the lanthanum compound is a lanthanum metal salt compound, the gallium compound is a gallium metal salt compound, and the neodymium compound is a neodymium metal salt compound.

In the precursor solution of a garnet-type solid electrolyte described above, it is preferred that the lithium metal salt compound, the lanthanum metal salt compound, the gallium metal salt compound, and the neodymium metal salt compound are nitrates.

In the precursor solution of a garnet-type solid electrolyte described above, it is preferred that the zirconium alkoxide has 4 or more and 8 or less carbon atoms or has a boiling point of 300° C. or higher.

A precursor solution of a garnet-type solid electrolyte of this application is a precursor solution of a garnet-type solid electrolyte represented by the following compositional formula, and contains one type of solvent, and a lithium compound, a lanthanum compound, a zirconium compound, a gallium compound, and a calcium compound, each of which has solubility in the solvent, wherein with respect to the stoichiometric composition of the following compositional formula, the amount of the lithium compound is 1.05 times or more and 1.30 times or less, and the amounts of the lanthanum compound, the zirconium compound, the gallium compound, and the calcium compound are equal.

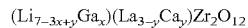

Provided that the following relationships are satisfied: $0.1 \leq x \leq 1.0$ and $0.0 < y \leq 0.2$.

In the precursor solution of a garnet-type solid electrolyte described above, it is preferred that the zirconium compound is a zirconium alkoxide, the lithium compound is a lithium metal salt compound, the lanthanum compound is a lanthanum metal salt compound, the gallium compound is a gallium metal salt compound, and the calcium compound is a calcium metal salt compound.

In the precursor solution of a garnet-type solid electrolyte described above, it is preferred that the lithium metal salt compound, the lanthanum metal salt compound, the gallium metal salt compound, and the calcium metal salt compound are nitrates.

In the precursor solution of a garnet-type solid electrolyte described above, it is preferred that the zirconium alkoxide has 4 or more and 8 or less carbon atoms or has a boiling point of 300° C. or higher.

In the precursor solution of a garnet-type solid electrolyte described above, it is preferred that the solvent is any of n-butyl alcohol, 2-n-butoxyethanol, 1,3-butanediol, 1,5-pentanediol, 1,2-hexanediol, 1,7-heptanediol, toluene, o-xylene, p-xylene, hexane, heptane, and octane.

In a method for producing a precursor solution of a garnet-type solid electrolyte of this application, the precursor solution of a garnet-type solid electrolyte described above is produced by performing a step of preparing multiple types of metal compound solutions by mixing metal compounds containing elements constituting the precursor solution and a solvent, a step of preparing a mixed solution by mixing the multiple types of metal compound solutions, and a solvent removal treatment for the mixed solution.

A garnet-type solid electrolyte of this application is produced using the precursor solution of a garnet-type solid electrolyte described above.

BRIEF DESCRIPTION OF THE DRAWINGS

FIG. 6D is a schematic view showing the method for producing a lithium-ion battery.

FIG. 7 is a table showing the compositions of solid electrolytes, and firing conditions and the like according to Examples and Comparative Examples.

FIG. 8 is a table showing the evaluation results of the solid electrolytes according to Examples and Comparative Examples.

DETAILED DESCRIPTION

Hereinafter, embodiments of the invention will be described with reference to the drawings. The embodiments described below describe an example of the invention. The invention is not limited to the following embodiments, and various modifications embodied within a range that does not change the gist of the invention are also included in the invention. Note that in the following respective drawings, in order to make respective members have a recognizable size, the reduction scales of the respective members are made different from the actual ones.

1. First Embodiment 1-1. Battery

Figure 1:
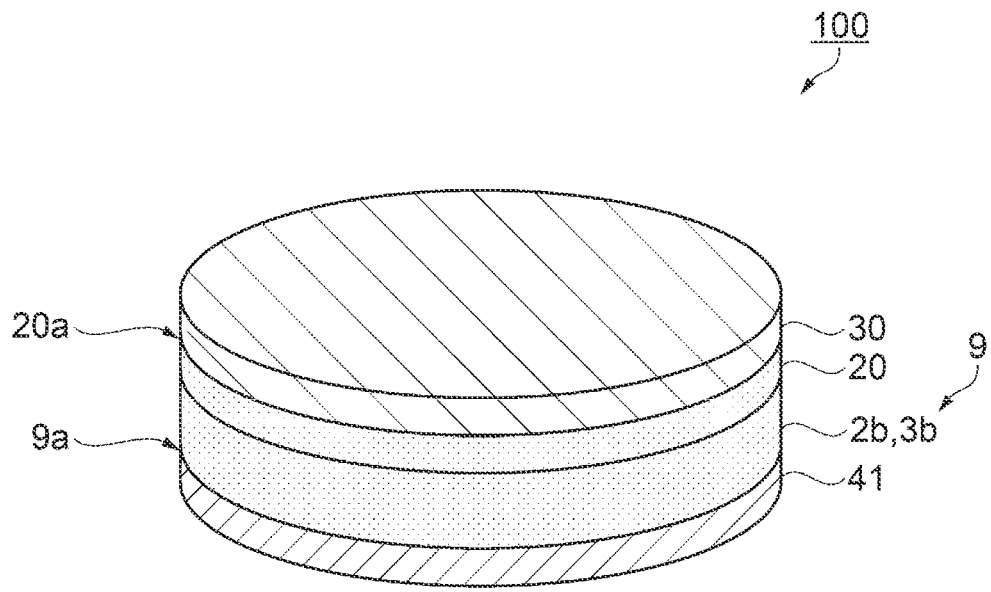
FIG. 1 is a schematic perspective view showing a configuration of a lithium-ion battery as a battery according to a first embodiment.

First, a battery including a solid electrolyte using a precursor solution of a garnet-type solid electrolyte according to this embodiment will be described with reference to FIG. 1. In this embodiment, a lithium-ion battery will be described as an example of the battery. FIG. 1 is a schematic perspective view showing a configuration of a lithium-ion battery as a battery according to a first embodiment. Note that in the present description, the garnet-type solid electrolyte refers to a solid electrolyte having a garnet-type or garnet-like crystal structure.

As shown in FIG. 1, a lithium-ion battery 100 of this embodiment includes a positive electrode 9 as a composite including a solid electrolyte 3b and an active material 2b, a negative electrode 30 as an electrode provided at one face of the positive electrode 9 through an electrolyte layer 20, and a first current collector 41 as a current collector provided in contact with the other face opposite to the one face of the positive electrode 9.

That is, the lithium-ion battery 100 is a stacked body in which the first current collector 41, the positive electrode 9, the electrolyte layer 20, and the negative electrode 30 are sequentially stacked. In the electrolyte layer 20, a face which is in contact with the negative electrode 30 is defined as one face 20a, and in the positive electrode 9, a face which is in contact with the first current collector 41 is defined as a surface 9a. Note that, although illustration is omitted, a second current collector may be provided as appropriate at the negative electrode 30.

1.1.1. Current Collector

For the first current collector 41 and the second current collector, any material can be suitably used as long as it is a forming material which does not cause an electrochemical reaction with the positive electrode 9 and the negative electrode 30, and has an electron conduction property. As the forming material of the first current collector 41 and the second current collector, for example, one type of metal simple substance selected from the group consisting of copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag), and palladium (Pd), an alloy containing one or more types of metal elements selected from the above-mentioned group, an electrically conductive metal oxide such as ITO (Tin-doped Indium Oxide), ATO (Antimony-doped Tin Oxide), or FTO (Fluorine-doped Tin Oxide), a metal nitride such as titanium nitride (TiN), zirconium nitride (ZrN), or tantalum nitride (TaN), and the like are exemplified.

As the form of the first current collector 41 and the second current collector, other than a thin film of the above-mentioned forming material having an electron conduction property, an appropriate form such as a metal foil, a plate form, a mesh-like form, a lattice-like form, or a paste obtained by kneading an electrically conductive fine powder together with a binder can be selected according to the intended purpose. The thickness of such a first current collector 41 and a second current collector is not particularly limited, but is, for example, about 20 µm. The formation of the first current collector 41 and the second current collector may be performed either after forming the positive electrode 9, the negative electrode 30, or the like, or before forming such members.

1.1.2. Negative Electrode

As a negative electrode active material contained in the negative electrode 30, that is, a forming material of the negative electrode 30, for example, niobium pentoxide ($Nb_2O_5$), vanadium pentoxide ($V_2O_5$), titanium oxide ($TiO_2$), indium oxide ($In_2O_3$), zinc oxide (ZnO), tin oxide ($SnO_2$), nickel oxide (NiO), ITO, ATO, FTO, aluminum (Al)-doped zinc oxide (AZO), gallium (Ga)-doped zinc oxide (GZO), an anatase phase of $TiO_2$, a lithium composite oxide such as $Li_4Ti_5O_{12}$ or $Li_2Ti_3O_7$, a metal and an alloy such as lithium (Li), silicon (Si), tin (Sn), a silicon-manganese alloy (Si—Mn), a silicon-cobalt alloy (Si—Co), a silicon-nickel alloy (Si—Ni), indium (In), and gold (Au), a carbon material, a material obtained by intercalation of lithium ions between layers of a carbon material, and the like are exemplified. In this embodiment, metal lithium (Li) is used as the negative electrode 30.

The thickness of the negative electrode 30 is preferably from approximately about 50 nm to about 100 μm, but can be arbitrarily designed according to a desired battery capacity or material properties.

The lithium-ion battery 100 has, for example, a circular disk shape, and the size of the outer shape thereof is such that the diameter is about 10 mm and the thickness is about 150 μm. In addition to being small and thin, the lithium-ion battery 100 can be charged and discharged, and is capable of obtaining a large output energy, and therefore can be suitably used as a power supply source, that is, a power supply for a portable information terminal or the like. The shape of the lithium-ion battery 100 is not limited to a circular disk shape, and may be, for example, a polygonal disk shape. Such a thin lithium-ion battery 100 may be used alone or multiple lithium-ion batteries 100 may be stacked and used. When the lithium-ion batteries 100 are stacked, the first current collector 41 and the second current collector are not necessarily essential components, and a configuration in which one of the current collectors is included may be adopted.

Figure 2:
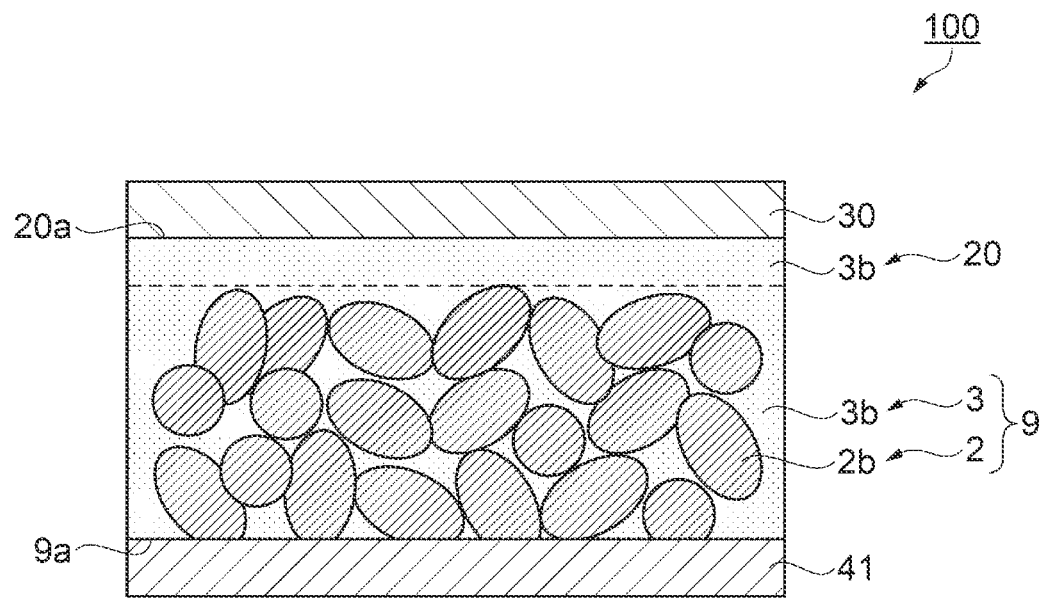
FIG. 2 is a schematic cross-sectional view showing a structure of the lithium-ion battery.

Next, the structures of the positive electrode 9, the electrolyte layer 20, and the like included in the lithium-ion battery 100 will be described with reference to FIG. 2. FIG. 2 is a schematic cross-sectional view showing a structure of the lithium-ion battery.

As shown in FIG. 2, the electrolyte layer 20 includes the solid electrolyte 3b, and the positive electrode 9 includes the active material 2b and the solid electrolyte 3b. The active material 2b is in the form of particles, and multiple particles of the active material 2b gather to form an active material portion 2 in which multiple pores are formed. That is, active material portion 2 is a porous material by itself.

1.1.3. Positive Electrode

The positive electrode 9 includes the active material portion 2 and an electrolyte portion 3. The multiple pores of the active material portion 2 in the positive electrode 9 communicate with one another in a mesh-like form inside the active material portion 2. Further, by the contact between the active materials 2b, an electron conduction property of the active material portion 2 is ensured. The solid electrolyte 3b is included in the electrolyte portion 3, and the electrolyte portion 3 is provided so as to fill up the multiple pores of the active material portion 2 and further cover the entire active material portion 2. That is, the active material portion 2 and the electrolyte portion 3 are combined to form the positive electrode 9 as a composite. Therefore, as compared to a case where the active material portion 2 does not have multiple pores or a case where the electrolyte portion 3 is not provided up to the inside of the pores, the contact area between the active material 2b and the solid electrolyte 3b becomes large. Due to this, the interfacial resistance is decreased, and it becomes possible to achieve favorable charge transfer at the interface between the active material portion 2 and the electrolyte portion 3.

As in the lithium-ion battery 100 of this embodiment, when the first current collector 41 is used at the positive electrode 9 side, a lithium composite metal compound which is a positive electrode active material containing lithium (Li) is used for the active material 2b. Note that FIG. 2 is a view schematically showing the active material 2b, and the particle diameter and size of each active material 2b are not necessarily the same as the actual ones.

The lithium composite metal compound to be used as the positive electrode active material refers to a compound such as an oxide, which contains lithium (Li) and also contains two or more types of metal elements as a whole, and in which the existence of oxoacid ions is not observed.

Examples of the lithium composite metal compound include composite metal compounds containing lithium (Li) and also containing one or more types of elements selected from vanadium (V), chromium (Cr), manganese (Mn), iron (Fe), cobalt (Co), nickel (Ni), and copper (Cu). Such a composite metal compound is not particularly limited, however, specific examples thereof include $LiCoO_2$, $LiNiO_2$, $LiMn_2O_4$, $Li_2Mn_2O_3$, $LiCr_{0.5}Mn_{0.5}O_2$, $LiFePO_4$, $Li_2FeP_2O_7$, $LiMnPO_4$, $LiFeBO_3$, $Li_3V_2(PO_4)_3$, $Li_2CuO_2$, $LiFeF_3$, $Li_2FeSiO_4$, $Li_2MnSiO_4$, NMC ($Li_a(Ni_xMn_yCo_{1-x-y})O_2$) and NCA ($Li(Ni_xCo_yAl_{1-x-y})O_2$). Further, solid solutions obtained by substituting some of the atoms in a crystal of any of these lithium composite metal compounds with another transition metal, typical metal, alkali metal, alkaline rare earth metal, lanthanoid, chalcogenide, halogen, or the like are also included in the lithium composite metal compound, and any of these solid solutions can also be used as the positive electrode active material. In this embodiment, as the active material 2b, among the above-mentioned lithium composite metal compounds, a lithium composite metal oxide containing lithium (Li) and oxygen (O) is used.

By using the lithium composite metal compound as the active material 2b for the forming material of the active material portion 2, electron transfer is performed between the particles of the active material 2b, and lithium ion transfer is performed between the active material 2b and the solid electrolyte 3b. According to this, the function as the active material portion 2 can be favorably exhibited.

The active material portion 2 has a bulk density of preferably 50% or more and 90% or less, more preferably 50% or more and 70% or less. When the active material portion 2 has such a bulk density, the surface area of the active material portion 2 becomes large, and it becomes easy to increase the contact area between the active material portion 2 and the electrolyte portion 3. According to this, in the lithium-ion battery 100, it becomes easier to increase the capacity than in the related art.

When the above-mentioned bulk density is denoted by β (%), the contour volume of the active material portion 2, that is, the apparent volume of the active material portion 2 is denoted by v, the mass of the active material portion 2 is denoted by w, and the density of the particles of the active material 2b is denoted by ρ, the following mathematical formula (a) is established. According to this, the bulk density can be determined.

$$\beta = \{w/(v \cdot \rho)\} \times 100 \quad \text{(a)}$$

In order to control the bulk density of the active material portion 2 to fall within the above range, the average particle diameter, that is, the median diameter of the active material 2b is preferably set to 0.3 μm or more and 10 μm or less, and is more preferably 0.5 μm or more and 5 μm or less. The average particle diameter of the active material 2b can be measured by, for example, dispersing the active material 2b in n-octyl alcohol at a concentration within a range of 0.1 mass % or more and 10 mass % or less, and determining the median diameter using a light scattering particle size distribution analyzer, Nanotrac (trademark) UPA-EX250 of MicrotracBEL Corporation.

The bulk density of the active material portion 2 may also be controlled by using a pore forming material in the step of forming the active material portion 2.

The resistivity of the active material portion 2 is preferably 700 Ω·cm or less. When the active material portion 2 has such a resistivity, a sufficient output can be obtained in the lithium-ion battery 100. The resistivity can be determined by adhering a copper foil as an electrode to the surface of the active material portion 2, and performing DC polarization measurement.

In the active material portion 2, the multiple pores communicate with one another in a mesh-like form inside, and also the active material portions 2 are coupled to one another to form a mesh-like structure. For example, a lithium composite metal oxide, LiCoO$_2$, which is a positive electrode active material, is known to have anisotropy in the electron conduction property in a crystal. Due to this, in a structure in which pores extend in a specific direction such that the pores are formed by machining, the electron conduction property may decrease depending on the direction of the electron conduction property in a crystal. On the other hand, in this embodiment, the active material portion 2 has a mesh-like structure, and therefore, an electrochemically active continuous surface can be formed regardless of the anisotropy in the electron conduction property or ion conduction property in a crystal. Due to this, a favorable electron conduction property can be ensured regardless of the type of the forming material to be used.

In the positive electrode 9, the contained amount of the binder as the binding agent for binding the active materials 2b or the pore forming material for adjusting the bulk density of the active material portion 2 is preferably reduced as much as possible. When the binder or the pore forming material remains in the positive electrode 9, such a component may sometimes adversely affect the electrical characteristics, and therefore, it is necessary to remove the component by carefully performing heating in the subsequent step. Specifically, in this embodiment, the mass reduction rate when the positive electrode 9 is heated at 400° C. for 30 minutes is set to 5 mass % or less. The mass reduction rate is more preferably 3 mass % or less, further more preferably 1 mass % or less, and still furthermore preferably, the mass reduction is not observed or is within the measurement error range. When the positive electrode 9 has such a mass reduction rate, the amount of a solvent or adsorbed water to be evaporated, an organic substance to be vaporized by combustion or oxidation, or the like is reduced under a predetermined heating condition. According to this, the electrical characteristics, particularly the charge-discharge characteristics of the lithium-ion battery 100 can be further improved.

The mass reduction rate of the positive electrode 9 can be determined from the values of the mass of the positive electrode 9 before and after heating under a predetermined heating condition using a thermogravimetric-differential thermal analyzer (TG-DTA).

In the lithium-ion battery 100, when the upper side of FIG. 2 is defined as an upward direction, the surface at the upper side of the positive electrode 9 is in contact with the electrolyte layer 20. The surface 9a at the lower side of the positive electrode 9 is in contact with the first current collector 41. In the positive electrode 9, the upper side in contact with the electrolyte layer 20 is one side, and the lower side in contact with the first current collector 41 is the other face, that is, the surface 9a.

On the surface 9a of the positive electrode 9, the active material portion 2 is exposed. Therefore, the active material portion 2 and the first current collector 41 are provided in contact with each other and both are electrically coupled to each other. The electrolyte portion 3 is provided up to the inside of the pores of the active material portion 2 and is in contact with the surface of the active material portion 2 including the inside of the pores of the active material portion 2 other than the face in contact with the first current collector 41. In the positive electrode 9 having such a configuration, the contact area between the active material portion 2 and the electrolyte portion 3 becomes larger than the contact area between the first current collector 41 and the active material portion 2. Due to this, the interface between the active material portion 2 and the electrolyte portion 3 is less likely to become a bottleneck of charge transfer, and therefore, favorable charge transfer is easily ensured as the positive electrode 9, and thus, it is possible to achieve high capacity and high output in the lithium-ion battery 100 including the positive electrode 9.

1.1.4. Solid Electrolyte

Here, the configuration of the solid electrolyte 3b included in the positive electrode 9 as the electrolyte portion 3 will be described. The solid electrolyte 3b includes a lithium composite metal oxide having a garnet-type crystal structure represented by the following compositional formula (1) or the following compositional formula (2). Here, the lithium composite metal oxide represented by the compositional formula (1) is hereinafter also simply referred to as the lithium composite metal oxide of the compositional formula (1), and the lithium composite metal oxide represented by the compositional formula (2) is hereinafter also simply referred to as the lithium composite metal oxide of the compositional formula (2).

$$(Li_{7-3x}Ga_x)(La_{3-y}Nd_y)Zr_2O_{12} \qquad (1)$$

$$(Li_{7-3x+y}Ga_x)(La_{3-y}Ca_y)Zr_2O_{12} \qquad (2)$$

Provided that the following relationships are satisfied: $0.1 \leq x \leq 1.0$ and $0.0 < y \leq 0.2$.

According to the lithium composite metal oxide of the compositional formula (1) or the compositional formula (2), by substituting some lithium (Li) in the crystal lattice with gallium (Ga), the solid electrolyte 3b in which the bulk lithium ion conduction property is improved can be achieved. Further, when substituting some lithium (Li) with gallium (Ga) in the crystal lattice, coarse particles are likely to be generated after firing in the process for forming the solid electrolyte 3b, however, by substituting some lanthanum (La) with neodymium (Nd) or calcium (Ca), the generation of coarse particles can be suppressed. By suppressing the generation of such coarse particles, the grain boundary resistance of the solid electrolyte 3b is decreased.

In the solid electrolyte 3b, the value x of the compositional ratio of Ga that substitutes some Li is within the range: $0.1 \leq x \leq 1.0$. By setting the value x within the range, the lithium ion conduction property can be improved. Further, the value y of the compositional ratio of Nd or Ca that substitutes some La is within the range: $0.0 < y \leq 0.2$. By setting the value y within the range, the average particle diameter of the solid electrolyte 3b can be decreased. When the average particle diameter of the solid electrolyte 3b is decreased, the grain boundary resistance of the solid electrolyte 3b is decreased, and the lithium ion conduction property is improved.

The total ion conductivity as the index of the lithium ion conduction property of the solid electrolyte 3b is preferably $1.0 \times 10^{-3}$ S/cm or more. When the solid electrolyte 3b has such a total ion conductivity, an ion contained in the electrolyte portion 3 at a position away from the surface of the active material portion 2 easily reaches the surface of the active material portion 2. Due to this, also the ion can contribute to the battery reaction in the active material portion 2, and the capacity of the lithium-ion battery 100 can be further increased.

Here, the ion conductivity of the solid electrolyte 3b, in other words, the ion conductivity of the electrolyte portion 3 refers to a grain bulk conductivity as the conductivity of the electrolyte portion 3 itself, and when the solid electrolyte 3b is a crystalline material, a grain boundary conductivity as the conductivity between crystal grains, and a total ion conductivity which is the sum of these conductivities. Further, the index of the grain boundary resistance in the electrolyte portion 3 is a grain boundary conductivity, and when the grain boundary conductivity increases, the grain boundary resistance decreases. The measurement method for the ion conductivity of the electrolyte portion 3 will be described later.

1.1.5. Electrolyte Layer

Going back to FIG. 2, the electrolyte layer 20 is provided between the positive electrode 9 and the negative electrode 30 as described above. The electrolyte layer 20 is a layer composed of an electrolyte that does not include the active material 2b. By interposing the electrolyte layer 20 that does not include the active material 2b between the positive electrode 9 and the negative electrode 30, the positive electrode 9 and the negative electrode 30 are less likely to be electrically coupled to each other, and the occurrence of a short circuit is suppressed. For the electrolyte layer 20, a crystalline material or an amorphous material composed of a metal compound such as an oxide, a sulfide, a halide, a nitride, a hydride, or a boride can be used.

Examples of an oxide crystalline material include $Li_{0.35}La_{0.55}TiO_3$, $Li_{0.2}La_{0.27}NbO_3$, and a perovskite-type crystal or a perovskite-like crystal in which the elements of a crystal thereof are partially substituted with N, F, Al, Sr, Sc, Nb, Ta, Sb, a lanthanoid element, or the like, $Li_7La_3Zr_2O_{12}$, $Li_5La_3Nb_2O_{12}$, $Li_5BaLa_2TaO_{12}$, and a garnet-type crystal or a garnet-like crystal in which the elements of a crystal thereof are partially substituted with N, F, Al, Sr, Sc, Nb, Ta, Sb, a lanthanoid element, or the like, $Li_{1.3}Ti_{1.7}Al_{0.3}(PO_4)_3$, $Li_{1.4}Al_{0.4}Ti_{1.6}(PO_4)_3$, $Li_{1.4}Al_{0.4}Ti_{1.4}Ge_{0.2}(PO_4)_3$, and a NASICON-type crystal in which the elements of a crystal thereof are partially substituted with N, F, Al, Sr, Sc, Nb, Ta, Sb, a lanthanoid element, or the like, a LISICON-type crystal such as $Li_{14}ZnGe_4O_{16}$, and other crystalline materials such as $Li_{3.4}V_{0.6}Si_{0.4}O_4$, $Li_{10}GeP_2S_{12}$, $Li_{9.6}P_3S_{12}$, $Li_{9.54}Si_{1.74}P_{1.44}S_{11.7}Cl_{0.3}$, and $Li_3PS_4$.

Examples of a sulfide crystalline material include $Li_{10}GeP_2S_{12}$, $Li_{9.6}P_3S_{12}$, $Li_{9.54}Si_{1.74}P_{1.44}S_{11.7}Cl_{0.3}$, and $Li_3PS_4$.

Further, examples of other amorphous materials include $Li_2O$—$TiO_2$, $La_2O_3$—$Li_2O$—$TiO_2$, $LiNbO_3$, $LiSO_4$, $Li_4SiO_4$, $Li_4SiO_4$—$Li_4SiO_4$, $Li_4GeO_4$—$Li_3VO_4$, $Li_4SiO_4$—$Li_3VO_4$, $Li_4GeO_4$—$Zn_2GeO_2$, $Li_4SiO_4$—$LiMoO_4$, $Li_4SiO_4$—$Li_4ZrO_4$, $SiO_2$—$P_2O_5$—$Li_2O$, $SiO_2$—$P_2O_5$—LiCl, $Li_2O$—LiCl—$B_2O_3$, $LiAlCl_4$, $LiAlF_4$, LiF—$Al_2O_3$, LiBr—$Al_2O_3$, $Li_{2.88}PO_{3.73}N_{0.14}$, $Li_{2.9}PO_{3.3}N_{0.46}$, $Li_3N$—LiCl, $Li_6NBr_3$, $Li_2S$—$SiS_2$, and $Li_2S$—$SiS_2$—$P_2S_5$.

Note that the electrolyte layer 20 may be formed using the above-mentioned solid electrolyte 3b. However, when the electrolyte of the electrolyte layer 20 is a crystalline material, the direction of lithium ion conduction is affected by the crystal plane in the crystal structure, but when it is an amorphous material, the direction of lithium ion conduction is hardly restricted. Therefore, it is preferred to form the electrolyte layer 20 using the amorphous solid electrolyte 3b as the electrolyte.

The thickness of the electrolyte layer 20 is preferably 0.1 μm or more and 100 μm or less, and more preferably 0.2 μm or more and 10 μm or less. By setting the thickness of the electrolyte layer 20 within the above range, the internal resistance of the electrolyte layer 20 can be decreased, and also the occurrence of a short circuit between the positive electrode 9 and the negative electrode 30 can be suppressed.

Note that in the one face 20a of the electrolyte layer 20, a relief structure of a trench, a grating, a pillar, or the like may be provided by combining various molding methods and processing methods as needed.

1.2. Precursor Solution of Solid Electrolyte

A precursor solution for producing the garnet-type solid electrolyte represented by the compositional formula (1) or the compositional formula (2) according to this embodiment will be described. Note that hereinafter, the precursor solution of the garnet-type solid electrolyte represented by the compositional formula (1) or the compositional formula (2) is also simply referred to as the precursor solution of the compositional formula (1) or the compositional formula (2), or the precursor solution. Further, hereinafter, the garnet-type solid electrolyte represented by the compositional formula (1) or the compositional formula (2) produced from the precursor solution is also simply referred to as the garnet-type solid electrolyte 3b of the compositional formula (1) or the compositional formula (2), or the solid electrolyte 3b.

The precursor solution of the garnet-type solid electrolyte represented by the following compositional formula (1) contains one type of solvent, and a lithium compound, a lanthanum compound, a zirconium compound, a gallium compound, and a neodymium compound as metal compounds having solubility in the solvent. With respect to the stoichiometric composition of the following compositional formula (1), the amount of the lithium compound is 1.05 times or more and 1.30 times or less, and the amounts of the lanthanum compound, the zirconium compound, the gallium compound, and the neodymium compound are equal.

$$(Li_{7-3x}Ga_x)(La_{3-y}Nd_y)Zr_2O_{12} \qquad (1)$$

Provided that the following relationships are satisfied: $0.1 \leq x \leq 1.0$ and $0.0 < y \leq 0.2$.

The precursor solution of the garnet-type solid electrolyte 3b represented by the following compositional formula (2) contains one type of solvent, and a lithium compound, a lanthanum compound, a zirconium compound, a gallium compound, and a calcium compound as metal compounds having solubility in the solvent. With respect to the stoichiometric composition of the following compositional formula (2), the amount of the lithium compound is 1.05 times or more and 1.30 times or less, and the amounts of the lanthanum compound, the zirconium compound, the gallium compound, and the calcium compound are equal.

$$(Li_{7-3x+y}Ga_x)(La_{3-y}Ca_y)Zr_2O_{12} \qquad (2)$$

Provided that the following relationships are satisfied: $0.1 \leq x \leq 1.0$ and $0.0 < y \leq 0.2$.

Examples of the zirconium compound include zirconium alkoxides such as zirconium tetramethoxide, zirconium tetraethoxide, zirconium tetra-n-propoxide, zirconium tetraisopropoxide, zirconium tetra-n-butoxide, zirconium tetraisobutoxide, zirconium tetra-sec-butoxide, zirconium tetra-tert-butoxide, zirconium tetrakis(dipivaloylmethanate), and zirconium tetra(2-ethylhexoxide), and one or more types selected from the group can be adopted.

It is preferred that the zirconium alkoxide has 4 or more and 8 or less carbon atoms or has a boiling point of 300° C. or higher. According to this, the occurrence of hydrolysis of the zirconium alkoxide is suppressed. That is, the pot life of the precursor solution of the solid electrolyte 3b can be extended as compared to a case where the zirconium alkoxide has less than 4 or more than 8 carbon atoms and also has a boiling point lower than 300° C.

Examples of the zirconium alkoxide that has 4 or more and 8 or less carbon atoms or has a boiling point of 300° C. or higher include zirconium tetraethoxide that has 2 carbon atoms and has a boiling point of about 420° C., zirconium tetraisopropoxide that has 3 carbon atoms and has a boiling point of about 420° C., zirconium tetra-n-propoxide that has 3 carbon atoms and has a boiling point of about 490° C., zirconium tetra-n-butoxide that has 4 carbon atoms and has a boiling point of about 555° C., zirconiumtetra-tert-butoxide that has 4 carbon atoms and has a boiling point of about 230° C., and zirconium tetra(2-ethylhexoxide) that has 8 carbon atoms and has a boiling point lower than 300° C. Note that the boiling point of the zirconium alkoxide is an approximate value calculated using the boiling point described in the safety data sheet issued by the manufacturer and the boiling point conversion chart described in Science of Petroleum, Vol. 2. P. 1281 (1938).

Examples of the lithium compound include lithium metal salt compounds such as lithium chloride, lithium nitrate, lithium acetate, lithium hydroxide, and lithium carbonate, and lithium alkoxides such as lithium methoxide, lithium ethoxide, lithium propoxide, lithium isopropoxide, lithium n-butoxide, lithium isobutoxide, lithium sec-butoxide, lithium tert-butoxide, and lithium dipivaloylmethanate, and one or more types selected from the group can be adopted.

Among these lithium compounds, from the viewpoint of improving the electrical characteristics of the lithium-ion battery 100, it is preferred to use a lithium metal salt compound, and it is more preferred to use a nitrate, that is, lithium nitrate as the lithium metal salt compound.

Examples of the lanthanum compound include lanthanum metal salt compounds such as lanthanum chloride, lanthanum nitrate, and lanthanum acetate, and lanthanum alkoxides such as lanthanum trimethoxide, lanthanum triethoxide, lanthanum tripropoxide, lanthanum triisopropoxide, lanthanum tri-n-butoxide, lanthanum triisobutoxide, lanthanum tri-sec-butoxide, lanthanum tri-tert-butoxide, and lanthanum tris (dipivaloylmethanate), and one or more types selected from the group can be adopted.

Among these lanthanum compounds, from the viewpoint of improving the electrical characteristics of the lithium-ion battery 100, it is preferred to use a lanthanum metal salt compound, and it is more preferred to use a nitrate, that is, lanthanum nitrate as the lanthanum metal salt compound.

Examples of the gallium compound include gallium metal salt compounds such as gallium bromide, gallium chloride, gallium iodide, and gallium nitrate, and gallium alkoxides such as gallium trimethoxide, gallium triethoxide, gallium tri-n-propoxide, gallium triisopropoxide, and gallium tri-n-butoxide, and one or more types selected from the group can be adopted.

Among these gallium compounds, from the viewpoint of improving the electrical characteristics of the lithium-ion battery 100, it is preferred to use a gallium metal salt compound, and it is more preferred to use a nitrate, that is, gallium nitrate as the gallium metal salt compound.

Examples of the neodymium compound include neodymium metal salt compounds such as neodymium bromide, neodymium chloride, neodymium fluoride, neodymium oxalate, neodymium acetate, neodymium nitrate, neodymium sulfate, neodymium trimethacrylate, neodymium triacetylacetonate, and neodymium tri-2-ethylhexanoate, and neodymium alkoxides such as neodymium triisopropoxide and neodymium trimethoxyethoxide, and one or more types selected from the group can be adopted.

Among these neodymium compounds, from the viewpoint of improving the electrical characteristics of the lithium-ion battery 100, it is preferred to use a neodymium metal salt compound, and it is more preferred to use a nitrate, that is, neodymium nitrate as the neodymium metal salt compound.

Examples of the calcium compound include calcium metal salt compounds such as calcium bromide, calcium chloride, calcium fluoride, calcium iodide, calcium nitrate, calcium oxalate, and calcium acetate, and calcium alkoxides such as calcium dimethoxide, calcium diethoxide, calcium diisopropoxide, calcium di-n-propoxide, calcium diisobutoxide, calcium di-n-butoxide, and calcium di-sec-butoxide, and one or more types selected from the group can be adopted.

Among these calcium compounds, from the viewpoint of improving the electrical characteristics of the lithium-ion battery 100, it is preferred to use a calcium metal salt compound, and it is more preferred to use a nitrate, that is, calcium nitrate as the calcium metal salt compound.

As the one type of solvent contained in the precursor solution of this embodiment, water or a single solvent of an organic solvent is used. The organic solvent is not particularly limited, however, examples thereof include alcohols such as methyl alcohol, ethyl alcohol, n-propyl alcohol, isopropyl alcohol, n-butyl alcohol, allyl alcohol, and ethylene glycol monobutyl ether (2-n-butoxyethanol), glycols such as 1,2-ethanediol, 1,3-propanediol, 1,3-butanediol, 1,5-pentanediol, 1,2-hexanediol, 1,7-heptandiol, and dipropylene glycol, ketones such as dimethyl ketone, methyl ethyl ketone (2-butanone), methyl propyl ketone, and methyl isobutyl ketone, esters such as methyl formate, ethyl formate, methyl acetate, and methyl acetoacetate, ethers such as diethylene glycol monomethyl ether, diethylene glycol monoethyl ether, diethylene glycol dimethyl ether, ethylene glycol monomethyl ether, ethylene glycol monoethyl ether, and dipropylene glycol monomethyl ether, organic acids such as formic acid, acetic acid, 2-ethylbutyric acid, and propionic acid, aromatics such as toluene, o-xylene, and p-xylene, amides such as formamide, N,N-dimethylformamide, N,N-diethylformamide, dimethylacetamide, and N-methylpyrrolidone, and saturated hydrocarbons such as hexane, heptane, and octane.

Among the above-mentioned organic solvents, as the solvent, it is preferred to use any one type selected from n-butyl alcohol, 2-n-butoxyethanol, 1,3-butanediol, 1,5-pentanediol, 1,2-hexanediol, 1,7-heptandiol, toluene, o-xylene, p-xylene, hexane, heptane, and octane, and it is more preferred to use 2-n-butoxyethanol.

The above-mentioned organic solvent is a neutral solvent. Therefore, when the lithium-ion battery 100 is produced by a liquid-phase method using the precursor solution and the positive electrode active material, erosion of the surface of the positive electrode active material by the organic solvent, that is, the solvent in the precursor solution can be suppressed. More particularly, the neutral solvent is less likely to cause an erosive action on the lithium composite metal oxide or the like, which is the positive electrode active material, as compared to an acidic or basic solvent. Therefore, erosion of the surface of the positive electrode active material is suppressed, and lithium ions are favorably transferred between the solid electrolyte composed of the precursor solution and the positive electrode active material. That is, the battery characteristics of the lithium-ion battery 100 can be improved.

Here, the single solvent refers to substantially not containing two or more types of solvents. However, impurities derived from the raw material of the solvent or the production step thereof or the like, and moisture contained due to moisture absorption when the solvent is an organic solvent shall be excluded.

Note that in the present description, the phrase "having solubility in the solvent" refers to having a property of being soluble at a concentration of 0.5 mol/kg or more in the solvent at 20° C.

1.3. Method for Producing Precursor Solution

Figure 3:
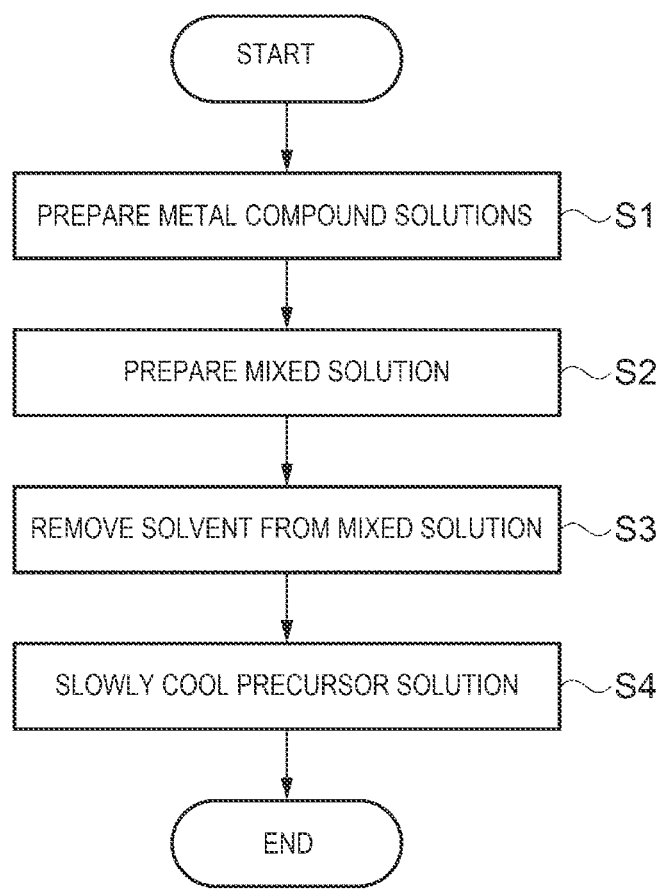
FIG. 3 is a process flow diagram showing a method for producing a precursor solution.
Figure 4A:
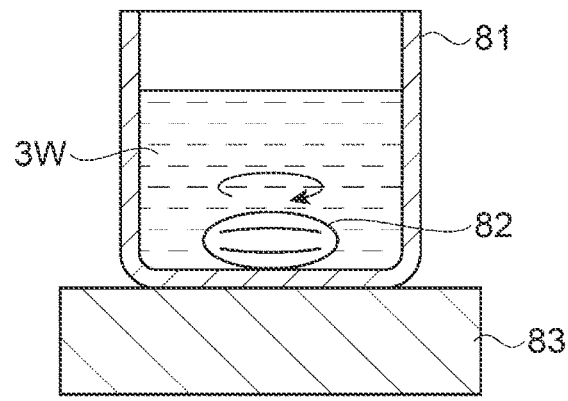
FIG. 4A is a schematic view showing the method for producing a precursor solution.
Figure 4B:
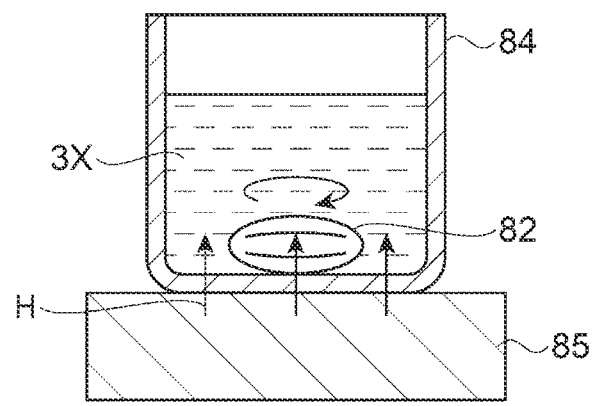
FIG. 4B is a schematic view showing the method for producing a precursor solution.

The method for producing a precursor solution according to this embodiment is a method for producing a precursor solution of the garnet-type solid electrolyte 3b of the compositional formula (1) or the compositional formula (2) described above. The production method will be described with reference to FIGS. 3, 4A and 4B. FIG. 3 is a process flow diagram showing the method for producing a precursor solution. Note that the process flow shown in FIG. 3 is an example and the method is not limited thereto. FIGS. 4A and 4B are schematic views showing the method for producing a precursor solution.

As shown in FIG. 3, the method for producing a precursor solution of this embodiment includes the following steps. In Step S1, multiple types of metal compound solutions are prepared by mixing metal compounds containing elements constituting the precursor solution and a solvent. In Step S2, a mixed solution is prepared by mixing the multiple types of metal compound solutions. In Step S3, the mixed solution is subjected to a solvent removal treatment, thereby forming a precursor solution. In Step S4, the precursor solution is slowly cooled.

1.3.1. Preparation of Metal Compound Solutions

In Step S1, each of the metal compound solutions is prepared by dissolving a metal compound containing each metal contained in the lithium composite metal oxide that is the garnet-type solid electrolyte 3b of the compositional formula (1) or the compositional formula (2) in a solvent. As the metal compound, the above-mentioned metal compounds are used. As the solvent, water or the above-mentioned organic solvent that can dissolve the metal compounds is used. Specifically, for example, a metal compound, a solvent, and a magnetic stirring bar are placed in a beaker made of Pyrex (trademark of Corning Incorporated) and stirred by a magnetic stirrer, thereby dissolving the metal compound in the solvent. By doing this, the metal compound solution is obtained. At that time, in order to accelerate the dissolution of the metal compound in the solvent, stirring may be performed while heating. Note that in the respective metal compound solutions, the type of the solvent need not be in common. Then, the process proceeds to Step S2.

1.3.2. Preparation of Mixed Solution

In Step S2, the respective metal compound solutions are mixed, thereby preparing a mixed solution of the respective metal compound solutions. Specifically, as shown in FIG. 4A, the respective metal compound solutions 3W are placed in a beaker 81 made of Pyrex. A magnetic stirring bar 82 is placed therein, and the beaker is placed on a magnetic stirrer 83, and the solutions are mixed while stirring. By doing this, a mixed solution 3X is obtained.

At that time, when the precursor solution of the garnet-type solid electrolyte 3b of the compositional formula (1) is prepared, with respect to the stoichiometric composition of the compositional formula (1), the amount of the lithium compound is set to 1.05 times or more and 1.30 times or less, and the amounts of the lanthanum compound, the zirconium compound, the gallium compound, and the neodymium compound are set equal.

Further, when the precursor solution of the garnet-type solid electrolyte 3b of the compositional formula (2) is prepared, with respect to the stoichiometric composition of the compositional formula (2), the amount of the lithium compound is set to 1.05 times or more and 1.30 times or less, and the amounts of the lanthanum compound, the zirconium compound, the gallium compound, and the calcium compound are set equal.

In this manner, when the amount of the lithium compound in the precursor solution is 1.05 times or more and 1.30 times or less with respect to the stoichiometric composition of the compositional formula (1) or the compositional formula (2), lithium volatilized in the firing step for forming the solid electrolyte 3b is compensated. Therefore, it becomes easy to obtain the desired garnet-type solid electrolyte 3b of the compositional formula (1) or the compositional formula (2), and the lithium ion conduction property can be further improved.

Note that when the solvent contained in the respective metal compound solutions 3W is not in common, the mixed solution 3X is prepared by additionally adding such multiple types of solvents to the mixture. The solvent is partially evaporated in the subsequent step, and therefore, the dissolving power is ensured so that the metal compounds are not deposited. Specifically, although described later, the mixed solution 3X is obtained by stirring the added multiple types of solvents. Then, the process proceeds to Step S3.

1.3.3. Solvent Removal from Mixed Solution

When multiple solvents are contained in the mixed solution 3X, the mixed solution 3X is heated so as to leave only one type of solvent having the highest boiling point and evaporate the other solvents. Specifically, as shown in FIG. 4B, the mixed solution 3X and the magnetic stirring bar 82 are placed in a reagent bottle 84 made of Pyrex (trademark of Corning Incorporated) and the reagent bottle is placed on a magnetic stirrer 85 with a hot plate function. Heat H is applied thereto while stirring with the magnetic stirrer 85 in a state where the lid of the reagent bottle 84 is opened. The heating temperature is set to a temperature lower by 10° C. or more than the boiling point of the solvent having the highest boiling point. For example, when 2-n-butoxyethanol and ethyl alcohol are contained as the solvent in the mixed solution 3X, the mixed solution 3X is heated to about 160° C. with respect to 171° C. that is the boiling point of 2-n-butoxyethanol, thereby evaporating ethyl alcohol.

At that time, when moisture incorporated due to moisture absorption or the like is contained in the mixed solution 3X, the moisture and ethyl alcohol form an azeotropic mixture having a boiling point of about 78.2° C. and are evaporated. In this manner, evaporation of the solvent and a dehydration treatment of the mixed solution 3X can both be performed.

Further, when ethyl alcohol is evaporated, the metal compound contained in the metal compound solution using ethyl alcohol as the solvent is subjected to a phase inversion treatment and dissolved in 2-n-butoxyethanol. Here, in order to carefully perform dehydration and evaporation of ethyl alcohol, a mixed solvent of ethyl alcohol and 2-n-butoxyethanol is added again, and heating may be performed again. In this manner, addition of ethyl alcohol and 2-n-butoxyethanol and heating may be repeated multiple times.

Note that when the number of types of solvents contained in the mixed solution 3X is 1, the dehydration treatment may be performed using a dehydrating agent or the like.

In Step S4, the mixed solution 3X having undergone the above-mentioned treatment is slowly cooled. At that time, in order to suppress incorporation of moisture due to moisture absorption, it is preferred that the mixed solution is placed in a reagent bottle or the like with a lid and the reagent bottle is covered with the lid and hermetically sealed, and the mixed solution is slowly cooled while stirring. The mixed solution is slowly cooled to about 25° C., whereby a precursor solution in a liquid state is obtained. It is preferred that the prepared precursor solution is hermetically sealed and stored so as to suppress moisture absorption during storage.

Here, the moisture amount in the precursor solution is preferably set to 10 ppm or less. By setting the moisture amount to 10 ppm or less, the pot life of the precursor solution is extended. In addition, it becomes easy to obtain the desired garnet-type solid electrolyte 3b of the compositional formula (1) or the compositional formula (2), and the lithium ion conduction property of the electrolyte portion 3 is improved.

The moisture amount in the precursor solution is measured using the Karl Fischer method. The measurement device is not particularly limited, but a trace moisture meter, AQS-2110ST of Hiranuma Sangyo Co., Ltd. can be adopted. By the above-mentioned operation, the precursor solution of the garnet-type solid electrolyte 3b of the compositional formula (1) or the compositional formula (2) is obtained.

1.4. Method for Producing Battery

Figure 5:
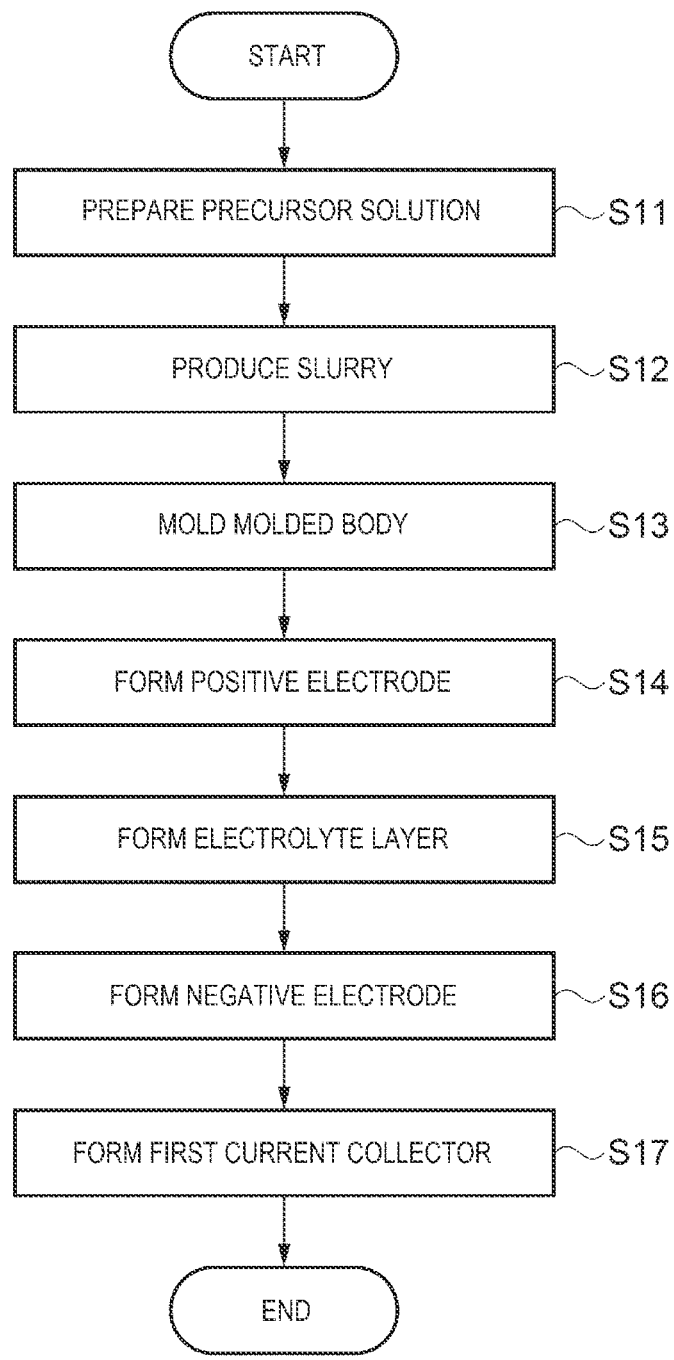
FIG. 5 is a process flow diagram showing a method for producing a lithium-ion battery.

Next, a method for producing the lithium-ion battery 100 using the precursor solution of this embodiment will be described with reference to FIGS. 5, 6A, 6B, 6C, and 6D. FIG. 5 is a process flow diagram showing the method for producing a lithium-ion battery. FIGS. 6A to 6D are schematic views showing the method for producing a lithium-ion battery. The process flow shown in FIG. 5 is an example and the method is not limited thereto. Note that in this embodiment, the production method in which the positive electrode 9 of the lithium-ion battery is formed using a liquid-phase method is illustrated.

As shown in FIG. 5, the method for producing the lithium-ion battery 100 of this embodiment includes the following steps. In Step S11, a precursor solution of the garnet-type solid electrolyte 3b of the compositional formula (1) or the compositional formula (2) is prepared. In Step S12, a slurry is produced by mixing the precursor solution and the active material 2b. In Step S13, a molded body is molded from the slurry. In Step S14, the positive electrode 9 is formed by subjecting the molded body to a heating treatment. In Step S15, the electrolyte layer 20 is formed at one face of the positive electrode 9. In Step S16, the negative electrode 30 is formed at the one face of the positive electrode 9 through the electrolyte layer 20. In Step S17, the first current collector 41 is formed at the surface 9a that is the other face of the positive electrode 9.

Here, in the method for producing the lithium-ion battery 100 of this embodiment, the method for producing a precursor solution of this embodiment described above is included. Specifically, in the method for producing the lithium-ion battery 100, the step S11 corresponds to Step S1 to Step S4 in the method for producing a precursor solution described above. Therefore, the description of Step S11 will be omitted.

In Step S12, first, the active material 2b is prepared. In this embodiment, as the active material 2b that is the forming material of the active material portion 2, lithium cobalt oxide ($LiCoO_2$) that is a lithium composite metal oxide is used. First, $LiCoO_2$ particles of Sigma-Aldrich Co. LLC. is subjected to a classification operation in n-butanol (butanol) using a wet-type centrifuge model LC-1000 of Krettek Separation GmbH, whereby the active material 2b in the form of particles having an average particle diameter of 5 μm is obtained.

Figure 6A:
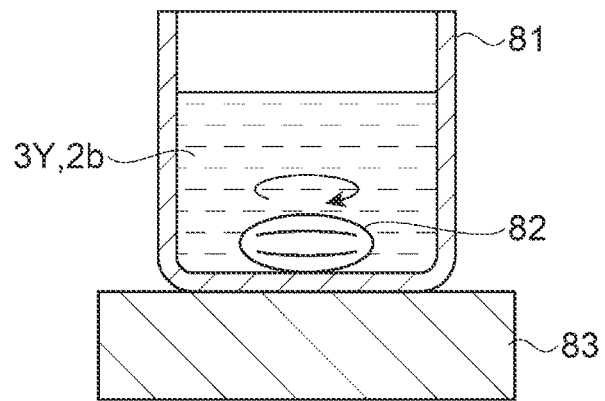
FIG. 6A is a schematic view showing the method for producing a lithium-ion battery.

Subsequently, the precursor solution and the active material 2b are mixed. Specifically, as shown in FIG. 6A, a precursor solution 3Y, the active material 2b, and the magnetic stirring bar 82 are placed in the beaker 81 made of Pyrex and mixed while stirring using the magnetic stirrer 83. By doing this, a slurry that is a mixture of the precursor solution 3Y and the active material 2b is obtained. Then, the process proceeds to Step S13.

Figure 6B:
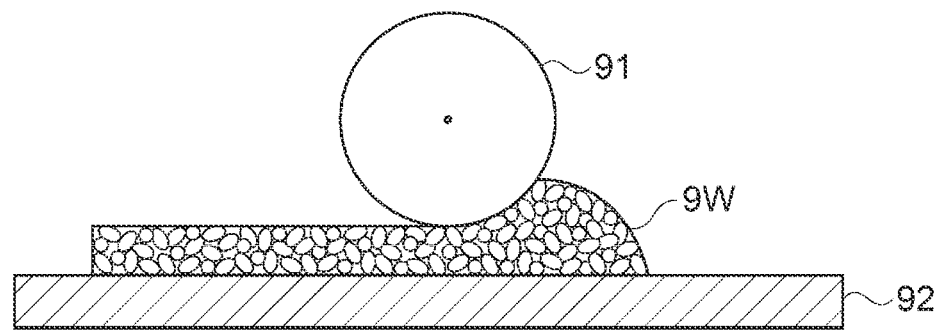
FIG. 6B is a schematic view showing the method for producing a lithium-ion battery.

In Step S13, the slurry is molded into a sheet shape, and thereafter molded into a circular disk shape. Specifically, as shown in FIG. 6B, a slurry 9W is coated onto a base material 92 such as a film and molded into a sheet shape using a coating machine 91 such as a bar coater. At that time, the thickness of the sheet is adjusted so that the thickness of the positive electrode 9 as a composite to be formed finally becomes 30 μm or more and 150 μm or less. The thickness can be appropriately changed in correspondence with the solid content concentration in the slurry 9W, the performance of the coating machine, or the like.

Figure 6C:
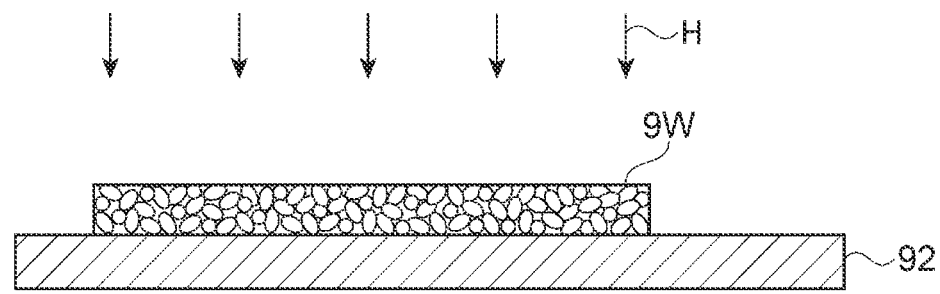
FIG. 6C is a schematic view showing the method for producing a lithium-ion battery.

Subsequently, as shown in FIG. 6C, heat H is applied to the sheet of the slurry 9W together with the base material 92, thereby evaporating the solvent contained in the slurry 9W. The heating temperature at that time is appropriately set according to the boiling point or vapor pressure of the solvent, or the like. Thereafter, the sheet of the slurry 9W is detached from the base material 92 and processed into a molded body having a desired shape, for example, a circular disk shape with a diameter of about 8.4 mm. Then, the process proceeds to Step S14.

In Step S14, the molded body is subjected to a heating treatment. The heating treatment includes a first heating treatment and a second heating treatment.

First, the molded body is subjected to calcination by the first heating treatment, whereby a calcined body is formed. The conditions of the first heating treatment are such that the heating temperature is 500° C. or higher and 650° C. or lower, and the heating time is 30 minutes or more and 2 hours or less. By the first heating treatment, the solvent derived from the precursor solution 3Y contained in the molded body is completely removed, and also an impurity such as an organic material is removed by combustion.

Subsequently, the calcined body is fired by the second heating treatment. The conditions of the second heating treatment are such that the heating temperature is 800° C. or higher and 1000° C. or lower, and the heating time is 4 hours or more and 10 hours or less. By the second heating treatment, the solid electrolyte 3b that is the garnet-type solid electrolyte of the compositional formula (1) or the compositional formula (2) is formed from the precursor solution 3Y. By doing this, the positive electrode 9 as a composite including the electrolyte portion 3 composed of the solid electrolyte 3b and the active material portion 2 composed of the active material 2b is obtained.

Note that in the first heating treatment and the second heating treatment, specifically, as shown in FIG. 6D, a molded body 9X of the slurry 9W is placed in a crucible 94 with a lid through a support 93. Then, the molded body 9X is placed in an electric muffle furnace or the like together with the crucible 94, and heat H is applied thereto. The crucible 94 is, for example, made of magnesium oxide. Note that the first heating treatment and the second heating treatment may be performed in a dry atmosphere or in an oxidative atmosphere. By doing this, the positive electrode 9 is obtained from the molded body 9X. Then, the process proceeds to Step S15.

In Step S15, the electrolyte layer 20 is formed at one face of the positive electrode 9. In this embodiment, a sputtering method is used for forming the electrolyte layer 20. Specifically, for example, the electrolyte layer 20 is formed by depositing LIPON ($Li_{2.9}PO_{3.3}N_{0.46}$) that is an amorphous electrolyte. Then, the process proceeds to Step S16.

In Step S16, the negative electrode 30 is formed at the one face of the positive electrode 9 through the electrolyte layer 20, in other words, at the one face 20a of the electrolyte layer 20. As a method for forming the negative electrode 30, other than a solution process such as a so-called sol-gel method or an organometallic thermal decomposition method involving a hydrolysis reaction or the like of an organometallic compound, a CVD (Chemical Vapor Deposition) method using an appropriate metal compound and an appropriate gas atmosphere, an ALD (Atomic Layer Deposition) method, a green sheet method or a screen printing method using a slurry of electrolyte particles, an aerosol deposition method, a sputtering method using an appropriate target and an appropriate gas atmosphere, a PLD (Pulsed Laser Deposition) method, a vacuum vapor deposition method, plating, thermal spraying, or the like can be used. Further, as a forming material of the negative electrode 30, the above-mentioned negative electrode active material can be adopted, and in this embodiment, metal lithium (Li) is used. Then, the process proceeds to Step S17.

In Step S17, first, a face opposite to a face, at which the electrolyte layer 20 is formed, of the positive electrode 9, that is, the positive electrode 9 at a lower face side is polished. At that time, by a polishing process, the active material portion 2 is reliably exposed to form the surface 9a. By doing this, electrical coupling between the active material portion 2 and the first current collector 41 to be formed thereafter can be ensured. Note that when the active material portion 2 is sufficiently exposed at the lower face side of the positive electrode 9 in the above-mentioned step, this polishing process may be omitted.

Subsequently, the first current collector 41 is formed at the surface 9a. Examples of a method for forming the first current collector 41 include a method in which an appropriate adhesive layer is separately provided to adhere the current collector, a gas phase deposition method such as a PVD (Physical Vapor Deposition) method, a CVD method, a PLD method, an ALD method, and an aerosol deposition method, and a wet method such as a sol-gel method, an organometallic thermal decomposition method, and plating, and an appropriate method can be used according to the reactivity with the face at which the first current collector is formed, an electrical conduction property desired for the electrical circuit, and the design of the electrical circuit. Further, as a forming material of the first current collector 41, the above-mentioned forming material can be adopted. By undergoing the above-mentioned steps, the lithium-ion battery 100 is produced.

As described above, by the precursor solution of the compositional formula (1) or the compositional formula (2), the method for producing a precursor solution, and the garnet-type solid electrolyte of the compositional formula (1) or the compositional formula (2) according to the first embodiment, the following effects can be obtained.

In the solid electrolyte 3b of the compositional formula (1) or the compositional formula (2), the lithium ion conduction property can be improved. More particularly, the precursor solution 3Y contains only a single type of solvent as the solvent. Therefore, when the solvent is evaporated, the deposition of the metals contained is more likely to uniformly proceed as compared to a case where multiple solvents are contained. In the solid electrolyte 3b, when the deposition of the constituent metals uniformly proceeds, a byproduct is less likely to be generated, and a non-uniform region is less likely to occur. According to this, the lithium ion conduction property of the solid electrolyte 3b is improved.

When the content of the lithium compound is 1.05 times or more and 1.30 times or less with respect to the stoichiometric composition of the compositional formula (1) or the compositional formula (2), lithium volatilized in the heating treatment step for forming the solid electrolyte 3b is compensated. Therefore, it becomes easy to obtain the desired garnet-type solid electrolyte 3b of the compositional formula (1) or the compositional formula (2), and the lithium ion conduction property can be further improved. Accordingly, the precursor solution 3Y of the garnet-type solid electrolyte 3b that improves the lithium ion conduction property can be provided.

By using a zirconium alkoxide as the zirconium compound, when the lithium-ion battery 100 is produced using the precursor solution 3Y and the active material 2b that is the positive electrode active material, a film of the solid electrolyte 3b that is relatively homogeneous is formed at the surface of the active material 2b.

Further, by using metal salt compounds as the other metal compounds, when the lithium-ion battery 100 is produced using the precursor solution 3Y and the active material 2b that is the positive electrode active material, an interface between the active material 2b and the solid electrolyte 3b is formed in a relatively well-organized manner. Due to this, the interface between the solid electrolyte 3b composed of the precursor solution 3Y and the active material 2b, that is, the interface between the electrolyte portion 3 and the active material portion 2 is favorably formed, and lithium ions are favorably transferred. Therefore, in the lithium-ion battery 100 including the positive electrode 9 composed of the solid electrolyte 3b and the active material 2b, the battery characteristics can be improved.

Since nitrates are used as the lithium metal salt compound, the lanthanum metal salt compound, the gallium metal salt compound, and the neodymium metal salt compound or the calcium metal salt compound, the battery characteristics of the lithium-ion battery 100 can be further improved. More particularly, the nitrate acts as a melt, and when the lithium-ion battery 100 is produced using the precursor solution 3Y and the active material 2b, the interface between the active material 2b and the solid electrolyte 3b is formed in a more organized manner.

In the zirconium alkoxide, the number of carbon atoms is 4 or more and 8 or less or the boiling point is 300° C. or higher, and therefore, the occurrence of hydrolysis of the zirconium alkoxide is suppressed. That is, the pot life of the precursor solution 3Y can be extended as compared to a case where the zirconium alkoxide has less than 4 or more than 8 carbon atoms or has a boiling point lower than 300° C.

When the lithium-ion battery 100 is produced using the precursor solution 3Y and the active material 2b, erosion of the surface of the active material 2b by the solvent in the precursor solution 3Y can be suppressed. More particularly, since a neutral solvent is used as the solvent, an erosive action is less likely to occur on the lithium composite metal oxide or the like of the positive electrode active material as compared to an acidic or basic solvent. Therefore, erosion of the surface of the active material $2b$ is suppressed, and lithium ions are favorably transferred between the solid electrolyte $3b$ composed of the precursor solution $3Y$ and the active material $2b$. That is, the battery characteristics of the lithium-ion battery 100 can be improved.

The precursor solution $3Y$ of the garnet-type solid electrolyte $3b$ that improves the lithium ion conduction property can be produced, and also the garnet-type solid electrolyte $3b$ in which the lithium ion conduction property is improved can be provided.

1.5. Examples and Comparative Examples

Next, the effects of the first embodiment will be more specifically described by showing Examples and Comparative Examples with respect to the solid electrolyte of the first embodiment. FIG. 7 is a table showing the compositions of solid electrolytes, and firing conditions and the like according to Examples and Comparative Examples. Note that weighing in the experiment in this description was performed up to 0.1 mg units using an analytical balance ME204T of Mettler Toledo International, Inc.

1.5.1. Preparation of Metal Compound Solutions

First, by using a lithium compound, a lanthanum compound, a zirconium compound, a gallium compound, a neodymium compound, a calcium compound, and a solvent, respective metal compound solutions were prepared.

1.5.1.1. 2-n-Butoxyethanol Solution of Lithium Nitrate at 1 mol/kg

In a 30-g reagent bottle made of Pyrex (trademark of Corning Incorporated) equipped with a magnetic stirring bar, 1.3789 g of lithium nitrate with a purity of 99.95%, 3N5, of Kanto Chemical Co., Inc. and 18.6211 g of 2-n-butoxyethanol (ethylene glycol monobutyl ether) Cica Special Grade of Kanto Chemical Co., Inc. were weighed. Then, the bottle was placed on a magnetic stirrer with a hot plate function, and lithium nitrate was completely dissolved in 2-n-butoxyethanol while stirring at 190° C. for 1 hour, followed by slow cooling to about 20° C., whereby a 2-n-butoxyethanol solution of lithium nitrate at 1 mol/kg was obtained. Note that the purity of lithium nitrate can be measured using an ion chromatography-mass spectrometer.

1.5.1.2. 2-n-Butoxyethanol Solution of Lanthanum Nitrate Hexahydrate at 1 mol/kg In a 30-g reagent bottle made of Pyrex equipped with a magnetic stirring bar, 8.6608 g of lanthanum nitrate hexahydrate, 4N, of Kanto Chemical Co., Inc. and 11.3392 g of the above-mentioned 2-n-butoxyethanol were weighed. Then, the bottle was placed on a magnetic stirrer with a hot plate function, and lanthanum nitrate hexahydrate was completely dissolved in 2-n-butoxyethanol while stirring at 140° C. for 30 minutes, followed by slow cooling to about 20° C., whereby a 2-n-butoxyethanol solution of lanthanum nitrate hexahydrate at 1 mol/kg was obtained.

1.5.1.3. Ethyl Alcohol Solution of Gallium Nitrate n-Hydrate at 1 mol/kg

In a 20-g reagent bottle made of Pyrex equipped with a magnetic stirring bar, 3.5470 g of gallium nitrate n-hydrate (n=5.5) of Kojundo Chemical Laboratory Co., Ltd. and 6.4530 g of ethyl alcohol were weighed. Then, the bottle was placed on a magnetic stirrer with a hot plate function, and gallium nitrate n-hydrate (n=5.5) was completely dissolved in ethyl alcohol while stirring at 90° C. for 1 hour, followed by slow cooling to about 20° C., whereby an ethyl alcohol solution of gallium nitrate n-hydrate (n=5.5) at 1 mol/kg was obtained. Note that the hydration number n of the gallium nitrate n-hydrate was specified as 5.5 from the result of mass reduction by a combustion experiment in a thermogravimetric-differential thermal analysis.

1.5.1.4. 2-n-Butoxyethanol Solution of Neodymium Nitrate n-Hydrate at 1 mol/kg

In a 20-g reagent bottle made of Pyrex equipped with a magnetic stirring bar, 4.2034 g of neodymium nitrate n-hydrate (n=5) of Kojundo Chemical Laboratory Co., Ltd. and 5.7966 g of the above-mentioned 2-n-butoxyethanol were weighed. Then, the bottle was placed on a magnetic stirrer with a hot plate function, and neodymium nitrate n-hydrate (n=5) was completely dissolved in 2-n-butoxyethanol while stirring at 140° C. for 30 minutes, followed by slow cooling to about 20° C., whereby a 2-n-butoxyethanol solution of neodymium nitrate n-hydrate (n=5) at 1 mol/kg was obtained. Note that the hydration number n of the neodymium nitrate n-hydrate was specified as 5 from the result of mass reduction by a combustion experiment in a thermogravimetric-differential thermal analysis.

1.5.1.5. 2-n-Butoxyethanol Solution of Calcium Nitrate Tetrahydrate at 1 mol/kg

In a 20-g reagent bottle made of Pyrex equipped with a magnetic stirring bar, 2.3600 g of calcium nitrate tetrahydrate of Kanto Chemical Co., Inc., and 7.6400 g of the above-mentioned 2-n-butoxyethanol were weighed. Then, the bottle was placed on a magnetic stirrer with a hot plate function, and calcium nitrate tetrahydrate was completely dissolved in 2-n-butoxyethanol while stirring at 100° C. for 30 minutes, followed by slow cooling to about 20° C., whereby a 2-n-butoxyethanol solution of calcium nitrate tetrahydrate at 1 mol/kg was obtained.

1.5.1.6. 2-n-Butoxyethanol Solution of Zirconium Tetra-n-Butoxide at 1 mol/kg

In a 20-g reagent bottle made of Pyrex equipped with a magnetic stirring bar, 3.8368 g of zirconium tetra-n-butoxide of Kojundo Chemical Laboratory Co., Ltd. and 6.1632 g of the above-mentioned 2-n-butoxyethanol were weighed. Then, the bottle was placed on a magnetic stirrer, and zirconium tetra-n-butoxide was completely dissolved in 2-n-butoxyethanol while stirring at about 20° C. for 30 minutes, whereby a 2-n-butoxyethanol solution of zirconium tetra-n-butoxide at 1 mol/kg was obtained.

1.5.2. Preparation of Mixed Solution and Precursor Solution

Subsequently, in Examples 1 to 8 and Comparative Examples 3 to 6, according to the composition of the solid electrolyte shown in FIG. 7, mixed solutions were prepared using the following procedure, and thereafter, precursor solutions were prepared from the mixed solutions. That is, Examples 1 to 8 and Comparative Examples 3 to 6 are levels at which the solid electrolytes are synthesized by a liquid-phase method. On the other hand, in Comparative Examples 1 and 2, the solid electrolytes are synthesized using a solid-phase method, and therefore, precursor solutions in a liquid state are not prepared. Here, among the solid electrolytes of Examples 1 to 8, Examples 1 to 4 and Example 8 are examples of the garnet-type solid electrolyte of the compositional formula (1), and Examples 5 to 7 are examples of the garnet-type solid electrolyte of the compositional formula (2). Note that Examples 1 to 8 are hereinafter also simply referred to as Examples, and Comparative Examples 1 to 6 are hereinafter also simply referred to as Comparative Examples.

1.5.2.1. Precursor Solution of $(Li_{5.5}Ga_{0.5})(La_{2.95}Nd_{0.05})Zr_2O_{12}$ of Example 1

In Example 1, first, a mixed solution for preparing a precursor solution of $(Li_{5.5}Ga_{0.5})(La_{2.95}Nd_{0.05})Zr_2O_{12}$ was prepared. Specifically, in a reagent bottle made of Pyrex, 7.1500 g of the 2-n-butoxyethanol solution of lithium nitrate at 1 mol/kg, 0.5000 g of the ethyl alcohol solution of gallium nitrate n-hydrate (n=5.5) at 1 mol/kg, 2.9500 g of the 2-n-butoxyethanol solution of lanthanum nitrate hexahydrate at 1 mol/kg, 0.0500 g of the 2-n-butoxyethanol solution of neodymium nitrate n-hydrate (n=5) at 1 mol/kg, 2.0000 g of the 2-n-butoxyethanol solution of zirconium tetra-n-butoxide at 1 mol/kg, 2 mL of ethyl alcohol, and 2 mL of 2-n-butoxyethanol were weighed, and a magnetic stirring bar was placed therein. Here, in Example 1, with respect to the stoichiometric composition of the solid electrolyte shown in FIG. 7, the amount of lithium nitrate as the Li source was set to 1.30 times, and the amounts of the other metal compounds were set equal. Subsequently, stirring was performed at about 20° C. for 30 minutes using a magnetic stirrer, whereby a mixed solution of Example 1 was obtained.

Subsequently, a precursor solution of Example 1 was prepared from the mixed solution of Example 1. Specifically, the reagent bottle made of Pyrex containing the mixture was placed on a magnetic stirrer with a hot plate function, and heated while stirring at 160° C. for 30 minutes. Heating was performed until ethyl alcohol in the mixed solution was evaporated, followed by slow cooling to about 20° C. Thereafter, 2 mL of ethyl alcohol and 2 mL of 2-n-butoxyethanol were weighed and added to the mixed solution, followed by stirring at about 20° C. for 30 minutes using a magnetic stirrer. Subsequently, the reagent bottle made of Pyrex was placed on a magnetic stirrer with a hot plate function again, and heated while stirring at 160° C. for 30 minutes. By the above-mentioned operation, ethyl alcohol and moisture in the mixed solution were volatilized, and also gallium nitrate blended in a solution state of ethyl alcohol was subjected to a phase inversion treatment in 2-n-butoxyethanol. Subsequently, the reagent bottle made of Pyrex was covered with a lid and tightly closed, and then, heating by the magnetic stirrer with a hot plate function was stopped, followed by slow cooling to about 20° C. while stirring, whereby the precursor solution of Example 1 was obtained. Thereafter, with respect to the precursor solution of Example 1, the moisture amount was measured by the above-mentioned method, and as a result, the moisture amount was 7 ppm.

Here, with respect to the precursor solution of Example 1, a metal element analysis by an ICP-AES (Inductively Coupled Plasma-Atomic Emission Spectrometry) analysis was performed. Specifically, the precursor solution was placed in a dish made of titanium, and the dish was placed on a hot plate set to 180° C. and heated for 1 hour and 30 minutes, thereby evaporating the solvent contained in the precursor solution. Subsequently, the resultant was thermally melted with potassium pyrosulfate and then acid-dissolved, whereby a measurement sample was prepared. With respect to the measurement sample, analytical measurement was performed using a high-resolution ICP emission spectroscopic analyzer PS3500DD2 manufactured by Hitachi High-Tech Science Corporation. After calculating the mass fraction from the analysis results, molar conversion was performed, whereby the metal element ratios of the precursor solution were obtained. As a result, the numerical values rounded off to the second decimal place were as follows: 7.15 for Li, 0.50 for Ga, 2.95 for La, 0.05 for Nd, and 2.00 for Zr, and found to be desired metal element ratios.

1.5.2.2. Precursor Solution of $(Li_{4.3}Ga_{0.9})(La_{2.98}Nd_{0.02})Zr_2O_{12}$ of Example 2

In Example 2, first, a mixed solution for preparing a precursor solution of $(Li_{4.3}Ga_{0.9})(La_{2.98}Nd_{0.02})Zr_2O_{12}$ was prepared. Specifically, in a reagent bottle made of Pyrex, 5.5900 g of the 2-n-butoxyethanol solution of lithium nitrate at 1 mol/kg, 0.9000 g of the ethyl alcohol solution of gallium nitrate n-hydrate (n=5.5) at 1 mol/kg, 2.9800 g of the 2-n-butoxyethanol solution of lanthanum nitrate hexahydrate at 1 mol/kg, 0.0200 g of the 2-n-butoxyethanol solution of neodymium nitrate n-hydrate (n=5) at 1 mol/kg, 2.0000 g of the 2-n-butoxyethanol solution of zirconium tetra-n-butoxide at 1 mol/kg, 2 mL of ethyl alcohol, and 2 mL of 2-n-butoxyethanol were weighed, and a magnetic stirring bar was placed therein. Here, in Example 2, with respect to the stoichiometric composition of the solid electrolyte shown in FIG. 7, the amount of lithium nitrate as the Li source was set to 1.30 times, and the amounts of the other metal compounds were set equal. Subsequently, stirring was performed at about 20° C. for 30 minutes using a magnetic stirrer, whereby a mixed solution of Example 2 was obtained.

Subsequently, a precursor solution of Example 2 was obtained in the same manner as in Example 1 from the mixed solution of Example 2. Thereafter, with respect to the precursor solution of Example 2, the moisture amount was measured by the above-mentioned method, and as a result, the moisture amount was 10 ppm.

1.5.2.3. Precursor Solution of $(Li_{6.4}Ga_{0.2})(La_{2.85}Nd_{0.15})Zr_2O_{12}$ of Example 3

In Example 3, first, a mixed solution for preparing a precursor solution of $(Li_{6.4}Ga_{0.2})(La_{2.85}Nd_{0.15})Zr_2O_{12}$ was prepared. Specifically, in a reagent bottle made of Pyrex, 8.3200 g of the 2-n-butoxyethanol solution of lithium nitrate at 1 mol/kg, 0.2000 g of the ethyl alcohol solution of gallium nitrate n-hydrate (n=5.5) at 1 mol/kg, 2.8500 g of the 2-n-butoxyethanol solution of lanthanum nitrate hexahydrate at 1 mol/kg, 0.1500 g of the 2-n-butoxyethanol solution of neodymium nitrate n-hydrate (n=5) at 1 mol/kg, 2.0000 g of the 2-n-butoxyethanol solution of zirconium tetra-n-butoxide at 1 mol/kg, 2 mL of ethyl alcohol, and 2 mL of 2-n-butoxyethanol were weighed, and a magnetic stirring bar was placed therein. Here, in Example 3, with respect to the stoichiometric composition of the solid electrolyte shown in FIG. 7, the amount of lithium nitrate as the Li source was set to 1.30 times, and the amounts of the other metal compounds were set equal. Subsequently, stirring was performed at about 20° C. for 30 minutes using a magnetic stirrer, whereby a mixed solution of Example 3 was obtained.

Subsequently, a precursor solution of Example 3 was obtained in the same manner as in Example 1 from the mixed solution of Example 3. Thereafter, with respect to the precursor solution of Example 3, the moisture amount was measured by the above-mentioned method, and as a result, the moisture amount was 8 ppm.

1.5.2.4. Precursor Solution of $(Li_{5.5}Ga_{0.5})(La_{2.96}Nd_{0.04})Zr_2O_{12}$ of Example 4

In Example 4, first, a mixed solution for preparing a precursor solution of $(Li_{5.5}Ga_{0.5})(La_{2.96}Nd_{0.04})Zr_2O_{12}$ was prepared. Specifically, in a reagent bottle made of Pyrex, 7.1500 g of the 2-n-butoxyethanol solution of lithium nitrate at 1 mol/kg, 0.5000 g of the ethyl alcohol solution of gallium nitrate n-hydrate (n=5.5) at 1 mol/kg, 2.9600 g of the 2-n-butoxyethanol solution of lanthanum nitrate hexahydrate at 1 mol/kg, 0.0400 g of the 2-n-butoxyethanol solution of neodymium nitrate n-hydrate (n=5) at 1 mol/kg, 2.0000 g of the 2-n-butoxyethanol solution of zirconium tetra-n-butoxide at 1 mol/kg, 2 mL of ethyl alcohol, and 2 mL of 2-n-butoxyethanol were weighed, and a magnetic stirring bar was placed therein. Here, in Example 4, with respect to the stoichiometric composition of the solid electrolyte shown in FIG. 7, the amount of lithium nitrate as the Li source was set to 1.30 times, and the amounts of the other metal compounds were set equal. Subsequently, stirring was performed at about 20° C. for 30 minutes using a magnetic stirrer, whereby a mixed solution of Example 4 was obtained.

Subsequently, a precursor solution of Example 4 was obtained in the same manner as in Example 1 from the mixed solution of Example 4. Thereafter, with respect to the precursor solution of Example 4, the moisture amount was measured by the above-mentioned method, and as a result, the moisture amount was 6 ppm.

1.5.2.5. Precursor Solution of $(Li_{5.55}Ga_{0.5})(La_{2.95}Ca_{0.05})Zr_2O_{12}$ of Example 5

In Example 5, first, a mixed solution for preparing a precursor solution of $(Li_{5.55}Ga_{0.5})(La_{2.95}Ca_{0.05})Zr_2O_{12}$ was prepared. Specifically, in a reagent bottle made of Pyrex, 7.2150 g of the 2-n-butoxyethanol solution of lithium nitrate at 1 mol/kg, 0.5000 g of the ethyl alcohol solution of gallium nitrate n-hydrate (n=5.5) at 1 mol/kg, 2.9500 g of the 2-n-butoxyethanol solution of lanthanum nitrate hexahydrate at 1 mol/kg, 0.0500 g of the 2-n-butoxyethanol solution of calcium nitrate tetrahydrate at 1 mol/kg, 2.0000 g of the 2-n-butoxyethanol solution of zirconium tetra-n-butoxide at 1 mol/kg, 2 mL of ethyl alcohol, and 2 mL of 2-n-butoxyethanol were weighed, and a magnetic stirring bar was placed therein. Here, in Example 5, with respect to the stoichiometric composition of the solid electrolyte shown in FIG. 7, the amount of lithium nitrate as the Li source was set to 1.30 times, and the amounts of the other metal compounds were set equal. Subsequently, stirring was performed at about 20° C. for 30 minutes using a magnetic stirrer, whereby a mixed solution of Example 5 was obtained.

Subsequently, a precursor solution of Example 5 was obtained in the same manner as in Example 1 from the mixed solution of Example 5. Thereafter, with respect to the precursor solution of Example 5, the moisture amount was measured by the above-mentioned method, and as a result, the moisture amount was 10 ppm.

1.5.2.6. Precursor Solution of $(Li_{4.32}Ga_{0.9})(La_{2.98}Ca_{0.02})Zr_2O_{12}$ of Example 6

In Example 6, first, a mixed solution for preparing a precursor solution of $(Li_{4.32}Ga_{0.9})(La_{2.98}Ca_{0.02})Zr_2O_{12}$ was prepared. Specifically, in a reagent bottle made of Pyrex, 5.6160 g of the 2-n-butoxyethanol solution of lithium nitrate at 1 mol/kg, 0.9000 g of the ethyl alcohol solution of gallium nitrate n-hydrate (n=5.5) at 1 mol/kg, 2.9800 g of the 2-n-butoxyethanol solution of lanthanum nitrate hexahydrate at 1 mol/kg, 0.0200 g of the 2-n-butoxyethanol solution of calcium nitrate tetrahydrate at 1 mol/kg, 2.0000 g of the 2-n-butoxyethanol solution of zirconium tetra-n-butoxide at 1 mol/kg, 2 mL of ethyl alcohol, and 2 mL of 2-n-butoxyethanol were weighed, and a magnetic stirring bar was placed therein. Here, in Example 6, with respect to the stoichiometric composition of the solid electrolyte shown in FIG. 7, the amount of lithium nitrate as the Li source was set to 1.30 times, and the amounts of the other metal compounds were set equal. Subsequently, stirring was performed at about 20° C. for 30 minutes using a magnetic stirrer, whereby a mixed solution of Example 6 was obtained.

Subsequently, a precursor solution of Example 6 was obtained in the same manner as in Example 1 from the mixed solution of Example 6. Thereafter, with respect to the precursor solution of Example 6, the moisture amount was measured by the above-mentioned method, and as a result, the moisture amount was 8 ppm.

1.5.2.7. Precursor Solution of $(Li_{6.55}Ga_{0.2})(La_{2.85}Ca_{0.15})Zr_2O_{12}$ of Example 7

In Example 7, first, a mixed solution for preparing a precursor solution of $(Li_{6.55}Ga_{0.2})(La_{2.85}Ca_{0.15})Zr_2O_{12}$ was prepared. Specifically, in a reagent bottle made of Pyrex, 8.5150 g of the 2-n-butoxyethanol solution of lithium nitrate at 1 mol/kg, 0.2000 g of the ethyl alcohol solution of gallium nitrate n-hydrate (n=5.5) at 1 mol/kg, 2.8500 g of the 2-n-butoxyethanol solution of lanthanum nitrate hexahydrate at 1 mol/kg, 0.1500 g of the 2-n-butoxyethanol solution of calcium nitrate tetrahydrate at 1 mol/kg, 2.0000 g of the 2-n-butoxyethanol solution of zirconium tetra-n-butoxide at 1 mol/kg, 2 mL of ethyl alcohol, and 2 mL of 2-n-butoxyethanol were weighed, and a magnetic stirring bar was placed therein. Here, in Example 7, with respect to the stoichiometric composition of the solid electrolyte shown in FIG. 7, the amount of lithium nitrate as the Li source was set to 1.30 times, and the amounts of the other metal compounds were set equal. Subsequently, stirring was performed at about 20° C. for 30 minutes using a magnetic stirrer, whereby a mixed solution of Example 7 was obtained.

Subsequently, a precursor solution of Example 7 was obtained in the same manner as in Example 1 from the mixed solution of Example 7. Thereafter, with respect to the precursor solution of Example 7, the moisture amount was measured by the above-mentioned method, and as a result, the moisture amount was 7 ppm.

1.5.2.8. Precursor Solution of $(Li_{5.5}Ga_{0.5})(La_{2.96}Nd_{0.04})Zr_2O_{12}$ of Example 8

In Example 8, first, a mixed solution for preparing a precursor solution of $(Li_{5.5}Ga_{0.5})(La_{2.96}Nd_{0.04})Zr_2O_{12}$ was prepared. Specifically, in a reagent bottle made of Pyrex, 7.1500 g of the 2-n-butoxyethanol solution of lithium nitrate at 1 mol/kg, 0.5000 g of the ethyl alcohol solution of gallium nitrate n-hydrate (n=5.5) at 1 mol/kg, 2.9600 g of the 2-n-butoxyethanol solution of lanthanum nitrate hexahydrate at 1 mol/kg, 0.0400 g of the 2-n-butoxyethanol solution of neodymium nitrate n-hydrate (n=5) at 1 mol/kg, 2.0000 g of the 2-n-butoxyethanol solution of zirconium tetra-n-butoxide at 1 mol/kg, 2 mL of ethyl alcohol, and 2 mL of 2-n-butoxyethanol were weighed, and a magnetic stirring bar was placed therein. Here, in Example 8, with respect to the stoichiometric composition of the solid electrolyte shown in FIG. 7, the amount of lithium nitrate as the Li source was set to 1.30 times, and the amounts of the other metal compounds were set equal. Subsequently, stirring was performed at about 20° C. for 30 minutes using a magnetic stirrer, whereby a mixed solution of Example 8 was obtained.

Subsequently, a precursor solution of Example 8 was obtained in the same manner as in Example 1 from the mixed solution of Example 8. Thereafter, with respect to the precursor solution of Example 8, the moisture amount was measured by the above-mentioned method, and as a result, the moisture amount was 9 ppm.

Note that with respect to the precursor solutions of Examples 2 to 8, the metal element ratios were examined in the same manner as in Example 1 and confirmed to be desired metal element ratios.

1.5.2.9. Precursor Solution of $(Li_{5.5}Ga_{0.5})(La_{2.95}Nd_{0.05})Zr_2O_{12}$ of Comparative Example 3

In Comparative Example 3, first, a mixed solution was prepared in the same manner as in Example 1. Subsequently, a precursor solution of Comparative Example 3 was prepared from the mixed solution of Comparative Example 3. Specifically, a reagent bottle made of Pyrex containing the mixture was placed on a magnetic stirrer with a hot plate function, and heated while stirring at 160° C. for 30 minutes. Heating was performed until ethyl alcohol in the mixed solution was evaporated, followed by slow cooling to about 20° C. Thereafter, 2 mL of ethyl alcohol and 2 mL of 2-n-butoxyethanol were weighed and added to the mixed solution, followed by stirring at about 20° C. for 30 minutes using a magnetic stirrer. Subsequently, the reagent bottle made of Pyrex was placed on a magnetic stirrer with a hot plate function again, and heated while stirring at 160° C. for 30 minutes. By the above-mentioned operation, ethyl alcohol and moisture in the mixed solution were volatilized, and also gallium nitrate blended in a solution state of ethyl alcohol was subjected to a phase inversion treatment in 2-n-butoxyethanol. Subsequently, heating by the magnetic stirrer with a hot plate function was stopped without covering the reagent bottle made of Pyrex with a lid, followed by slow cooling to about 20° C. while stirring, whereby the precursor solution of Comparative Example 3 was obtained. Thereafter, with respect to the precursor solution of Comparative Example 3, the moisture amount was measured by the above-mentioned method, and as a result, the moisture amount was 14 ppm.

1.5.2.10. Precursor Solution of $(Li_{5.55}Ga_{0.5})(La_{2.95}Ca_{0.05})Zr_2O_{12}$ of Comparative Example 4

In Comparative Example 4, first, a mixed solution was prepared in the same manner as in Example 5. Subsequently, a precursor solution of Comparative Example 4 was prepared from the mixed solution of Comparative Example 4. Specifically, the reagent bottle made of Pyrex containing the mixture was placed on a magnetic stirrer with a hot plate function, and heated while stirring at 160° C. for 15 minutes. Heating was performed until ethyl alcohol in the mixed solution was evaporated, followed by slow cooling to about 20° C., whereby the precursor solution of Comparative Example 4 was obtained. In Comparative Example 4, the solvent removal treatment for the mixed solution was performed only once without repeating the treatment. Thereafter, with respect to the precursor solution of Comparative Example 4, the moisture amount was measured by the above-mentioned method, and as a result, the moisture amount was 200 ppm.

1.5.2.11. Precursor Solution of $(Li_{5.5}Ga_{0.5})(La_{2.95}Nd_{0.05})Zr_2O_{12}$ of Comparative Example 5

In Comparative Example 5, 2-n-butoxyethanol and ethyl alcohol were sufficiently subjected to a dehydration treatment using a dehydrating agent. The moisture amount after the dehydration treatment was measured by the above-mentioned method, and as a result, the moisture amount was 4 ppm in 2-n-butoxyethanol and 9 ppm in ethyl alcohol. A mixed solution was prepared in the same manner as in Example 1 except that the 2-n-butoxyethanol and the ethyl alcohol subjected to the dehydration treatment were used, and the mixed solution was directly used as a precursor solution of Comparative Example 5. That is, in the precursor solution of Comparative Example 5, two types of solvents of 2-n-butoxyethanol and ethyl alcohol exist in a mixed state. With respect to the precursor solution of Comparative Example 5, the moisture amount was measured by the above-mentioned method, and as a result, the moisture amount was 8 ppm.

1.5.2.12. Precursor Solution of $(Li_{5.55}Ga_{0.5})(La_{2.95}Ca_{0.05})Zr_2O_{12}$ of Comparative Example 6

In Comparative Example 6, 2-n-butoxyethanol in which the moisture amount was 4 ppm and ethyl alcohol in which the moisture amount was 9 ppm were prepared by a dehydration treatment in the same manner as in Comparative Example 5. A mixed solution was prepared in the same manner as in Example 5 except that the 2-n-butoxyethanol and the ethyl alcohol subjected to the dehydration treatment were used, and the mixed solution was directly used as a precursor solution of Comparative Example 6. That is, in the precursor solution of Comparative Example 6, two types of solvents of 2-n-butoxyethanol and ethyl alcohol exist in a mixed state. With respect to the precursor solution of Comparative Example 6, the moisture amount was measured by the above-mentioned method, and as a result, the moisture amount was 9 ppm.

1.5.3. Production of Solid Electrolyte Pellet 1.5.3.1. Solid Electrolyte Pellets of Examples and Comparative Examples 3 to 6

Solid electrolyte pellets for evaluation were produced using the precursor solutions of Examples and Comparative Examples prepared above. Note that as the solid electrolytes shown in FIG. 7, those included in the electrolyte portions when producing lithium-ion batteries are shown. The evaluation of the solid electrolyte pellet described below is evaluation of the solid electrolyte in the electrolyte portion.

First, the precursor solution is placed in a dish made of titanium having an inner diameter of 50 mm and a height of 20 mm. This dish was placed on a hot plate and heated for 1 hour by setting the set temperature of the hot plate to 160° C., and then heated for 30 minutes by setting the set temperature to 180° C. to remove the solvent. Subsequently, the dish was heated for 30 minutes by setting the set temperature of the hot plate to 360° C. to decompose most of the contained organic components by combustion. Thereafter, the dish was heated for 1 hour by setting the set temperature of the hot plate to 540° C. as a first heating treatment to burn and decompose the remaining organic components. Thereafter, the dish was slowly cooled to about 20° C. on the hot plate, whereby a 540° C.-calcined body was obtained.

Subsequently, the 540° C.-calcined body was transferred to an agate mortar and sufficiently ground and mixed with an agate pestle. A 0.1500-g portion was weighed out of the mortar and then pressed with a pressure of 0.624 kN/mm² (624 MPa) for 5 minutes using a die with an exhaust port having an inner diameter of 10 mm as a molding die, whereby a 540° C.-calcined body pellet that is a circular disk-shaped molded material was produced.

Further, the 540° C.-calcined body pellet was subjected to a second heating treatment. Specifically, the 540° C.-calcined body pellet was placed in a crucible made of magnesium oxide, the crucible was covered with a lid made of magnesium oxide, and then, main firing was performed in an electric muffle furnace FP311 of Yamato Scientific Co., Ltd. Note that the firing conditions as the second heating treatment were set to 1000° C. and 8 hours. Subsequently, the electric muffle furnace was slowly cooled to about 20° C., and then, the pellet was taken out, whereby the solid electrolyte pellet for evaluation having a diameter of about 9.5 mm and a thickness of about 600 μm was formed.

The above operation was performed for the precursor solutions of Examples and Comparative Examples 3 to 6, whereby respective solid electrolyte pellets were prepared.

Here, methods for producing solid electrolyte pellets for evaluation of Comparative Examples 1 and 2 will be described. As described above, in Comparative Examples 1 and 2, the solid electrolytes are formed by a solid-phase method.

1.5.3.2. Solid Electrolyte Pellet of Comparative Example 1

In Comparative Example 1, a powder mixture of metal compounds was prepared according to the composition of the solid electrolyte shown in FIG. 7: $(Li_{5.5}Ga_{0.5})(La_{2.95}Nd_{0.05})Zr_2O_{12}$. Specifically, 0.5723 g of lanthanum zirconate of Toshima Manufacturing Co., Ltd., 0.2642 g of lithium carbonate of Kanto Chemical Co., Inc., 0.1548 g of lanthanum oxide having a purity of 99.99% of FUJIFILM Wako Pure Chemical Corporation, 0.0469 g of gallium oxide of Kojundo Chemical Laboratory Co., Ltd., and 0.0084 g of neodymium oxide having a purity of 99.99% of FUJIFILM Wako Pure Chemical Corporation were weighed, and then transferred to an agate mortar and sufficiently ground and mixed with an agate pestle. A 0.1500-g portion was weighed out of the mortar and then pressed with a pressure of 0.624 kN/mm$^2$ (624 MPa) for 5 minutes using a die with an exhaust port having an inner diameter of 10 mm as a molding die, whereby a circular disk-shaped molded material was produced. Here, in Comparative Example 1, with respect to the stoichiometric composition of the solid electrolyte shown in FIG. 7, the amount of lithium carbonate as the Li source was set to 1.30 times, and the amounts of the other metal compounds were set equal.

Specifically, the circular disk-shaped molded material was placed in a crucible made of magnesium oxide, the crucible was covered with a lid made of magnesium oxide, and then, main firing was performed in an electric muffle furnace FP311 of Yamato Scientific Co., Ltd. Note that the firing conditions were set to 1000° C. and 8 hours. Subsequently, the electric muffle furnace was slowly cooled to about 20° C., and then, the pellet was taken out, whereby the solid electrolyte pellet of Comparative Example 1 for evaluation having a diameter of about 9.5 mm and a thickness of about 600 μm was formed.

1.5.3.3. Solid Electrolyte Pellet of Comparative Example 2

In Comparative Example 2, a powder mixture of metal compounds was prepared according to the composition of the solid electrolyte shown in FIG. 7: $(Li_{5.55}Ga_{0.5})(La_{2.95}Ca_{0.05})Zr_2O_{12}$. Specifically, 0.5723 g of lanthanum zirconate of Toshima Manufacturing Co., Ltd., 0.2666 g of lithium carbonate of Kanto Chemical Co., Inc., 0.1548 g of lanthanum oxide having a purity of 99.99% of FUJIFILM Wako Pure Chemical Corporation, 0.0469g of gallium oxide of Kojundo Chemical Laboratory Co., Ltd., and 0.0050 g of calcium carbonate having a purity of 99.99% of FUJIFILM Wako Pure Chemical Corporation were weighed, and then transferred to an agate mortar and sufficiently ground and mixed with an agate pestle. A 0.1500-g portion was weighed out of the mortar and then pressed with a pressure of 0.624 kN/mm$^2$ (624 MPa) for 5 minutes using a die with an exhaust port having an inner diameter of 10 mm as a molding die, whereby a circular disk-shaped molded material was produced. Here, in Comparative Example 2, with respect to the stoichiometric composition of the solid electrolyte shown in FIG. 7, the amount of lithium carbonate as the Li source was set to 1.30 times, and the amounts of the other metal compounds were set equal. The operation thereafter was performed in the same manner as in Comparative Example 1, whereby the solid electrolyte pellet of Comparative Example 2 for evaluation was formed.

1.5.4. Evaluation of Solid Electrolyte Pellet

The evaluation results of Examples and Comparative Examples will be described with reference to FIG. 8. FIG. 8 is a table showing the evaluation results of the solid electrolytes according to Examples and Comparative Examples.

1.5.4.1. XRD Analysis and Raman Analysis

With respect to the solid electrolyte pellets of Examples and Comparative Examples, the presence or absence of byproducts was confirmed by an X-ray diffraction (XRD) analysis, and a crystal system was studied from a Raman scattering spectrum by a Raman analysis. Specifically, an X-ray diffractometer MRD of Royal Philips and a Raman spectrometer S-2000 of JEOL Ltd. were used. These results are shown in FIG. 8. In the column of the crystal system in FIG. 8, c indicates that the crystal system is a cubic crystal, t indicates that the crystal system is a tetragonal crystal, and t+c indicates that a cubic crystal and a tetragonal crystal exist in a mixed state.

As shown in FIG. 8, in Examples 1 to 8 and Comparative Examples 3 to 8, the crystal system of the solid electrolyte was a cubic crystal. Further, in Comparative Examples 5 and 6, a diffraction peak of $Ga_2O_3$ was observed. From this, it was found that in Comparative Examples 5 and 6, $Ga_2O_3$ was generated as a byproduct in the solid electrolyte. From this, it was demonstrated that in the solid electrolytes of Examples, phase transition from a cubic crystal to a tetragonal crystal is accelerated, and the crystal is stabilized. That is, improvement of the lithium ion conduction property in the solid electrolyte can be expected. On the other hand, in Comparative Examples 1 and 2 in which the synthesis was performed by a solid-phase method, in the solid electrolytes, a cubic crystal and a tetragonal crystal existed in a mixed state. Therefore, it was found that in Comparative Examples 1 and 2, phase transition from a cubic crystal to a tetragonal crystal does not sufficiently proceed, and the stabilization of the crystal is not achieved.

1.5.4.2. Lithium Ion Conduction Property

With respect to the solid electrolyte pellets of Examples and Comparative Examples, the lithium ion conductivity as an index of the lithium ion conduction property was evaluated by the following method.

A lithium electrode that is an ion activation electrode having a diameter of 8 mm was produced by lithium vapor deposition on both front and back faces of the solid electrolyte pellet. Subsequently, by using an impedance analyzer SI 1260 of Solartron, Inc., AC impedance measurement was performed. Note that in the measurement, the AC amplitude was set to 10 mV and the measurement frequency was set to $10^7$ Hz to $10^{-1}$ Hz.

A grain bulk conductivity, a grain boundary conductivity, and a total ion conductivity as lithium ion conductivities were calculated from a grain bulk component of the spectrum and a grain boundary component of the spectrum in a Cole-Cole plot that is an impedance spectrum obtained by the AC impedance measurement. The values are shown in FIG. 8.

As shown in FIG. 8, in the solid electrolyte pellets of Examples 1 to 8, the grain bulk conductivity and the grain boundary conductivity were $10^{-3}$ or more and less than $10^{-2}$, and also the total ion conductivity was $1.0 \times 10^{-3}$ S/cm or more. The total ion conductivity that is an index of the lithium ion conduction property of the solid electrolyte is preferably $1.0 \times 10^{-3}$ S/cm or more, and the total ion conductivities of the solid electrolyte pellets of Examples 1 to 8 exceeded this value. Therefore, it was demonstrated that by the precursor solution of the garnet-type solid electrolyte represented by the compositional formula (1) or the compositional formula (2), the lithium ion conduction property of the solid electrolyte is improved.

On the other hand, in the solid electrolyte pellets of Comparative Examples 1 to 6, the total ion conductivity was $1.0 \times 10^{-4}$ S/cm or less. From this result, it was found that the lithium ion conduction property of the solid electrolytes of Comparative Examples 1 to 6 is inferior to that of Examples.

2. Second Embodiment

2.1. Method for Producing Battery

Figure 9:
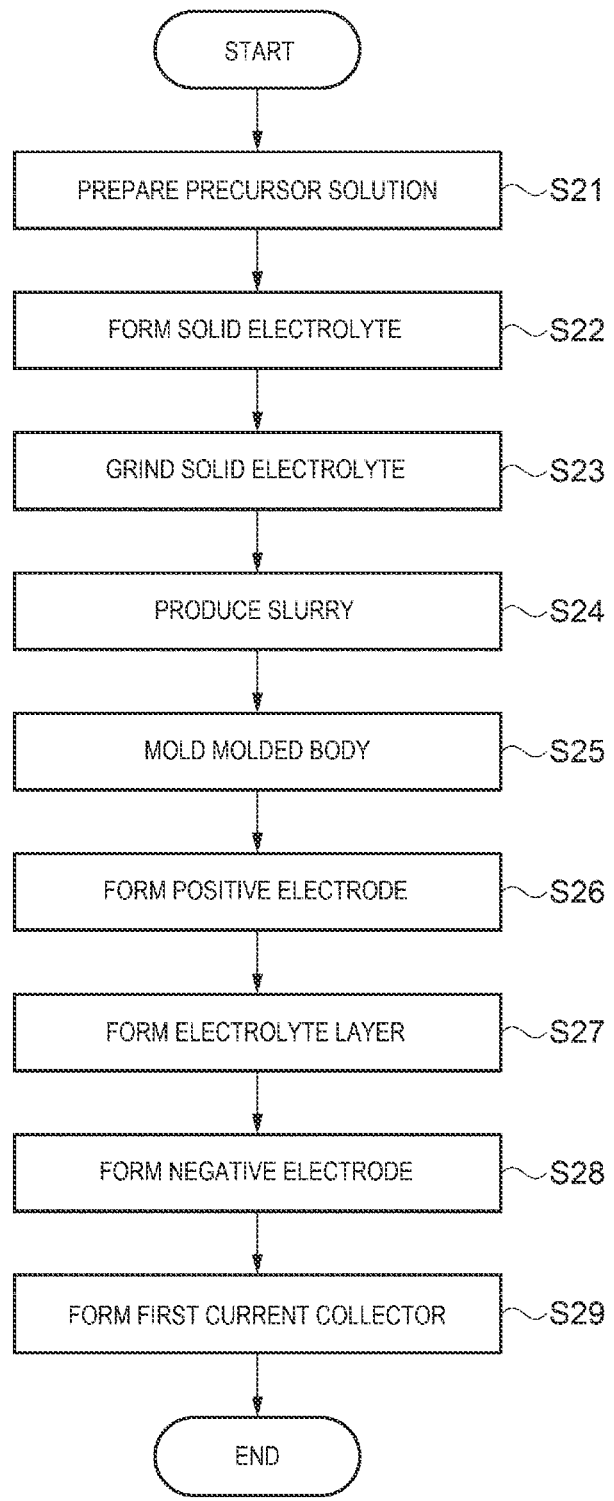
FIG. 9 is a process flow diagram showing a method for producing a lithium-ion battery according to a second embodiment.

A method for producing a lithium-ion battery as a battery using the precursor solution of this embodiment will be described with reference to FIG. 9. FIG. 9 is a process flow diagram showing the method for producing a lithium-ion battery according to a second embodiment. Note that the process flow shown in FIG. 9 is an example and the method is not limited thereto. Further, the same constituent portions as in the first embodiment are denoted by the same reference numerals and a repeated description thereof will be omitted.

As shown in FIG. 9, the method for producing a lithium-ion battery of this embodiment includes the following steps. In Step S21, the precursor solution 3Y of the garnet-type solid electrolyte 3b of the compositional formula (1) or the compositional formula (2) is prepared. In Step S22, the solid electrolyte 3b is formed by subjecting the precursor solution 3Y to a first heating treatment and a second heating treatment as a heating treatment. In Step S23, the solid electrolyte is ground into a powder. In Step S24, a slurry is produced by mixing the powder of the solid electrolyte 3b, the active material 2b, and a solvent. In Step S25, a molded body is molded from the slurry. In Step S26, the positive electrode 9 is formed by subjecting the molded body to a third heating treatment. In Step S27, the electrolyte layer 20 is formed at one face of the positive electrode 9. In Step S28, the negative electrode 30 is formed at the one face of the positive electrode 9 through the electrolyte layer 20. In Step S29, the first current collector 41 is formed at the surface 9a that is the other face of the positive electrode 9.

Here, in the method for producing a lithium-ion battery of this embodiment, the method for producing the precursor solution 3Y of the first embodiment is included. Specifically, in the method for producing a lithium-ion battery, the step S21 corresponds to Step S1 to Step S4 in the method for producing the precursor solution 3Y in the first embodiment. Further, Step S27 to Step S29 are performed in the same manner as Step S15 to Step S17 in the method for producing the lithium-ion battery 100 in the first embodiment. Therefore, the description of Step S21 and Step S27 to Step S29 will be omitted.

In Step S22, the solid electrolyte 3b is formed by subjecting the precursor solution 3Y to a heating treatment. The heating treatment includes a first heating treatment and a second heating treatment. First, the precursor solution 3Y is subjected to the first heating treatment, whereby a calcined body is formed. More particularly, the precursor solution 3Y is subjected to the first heating treatment, whereby removal of the solvent by volatilization and removal of the organic components by combustion or thermal decomposition are performed. The heating temperature in the first heating treatment is set to 500° C. or higher and 650° C. or lower. Specifically, the precursor solution 3Y is placed in a dish made of titanium having an inner diameter of 50 mm and a height of 20 mm, and the dish is placed on a hot plate and heated for 1 hour by setting the set temperature of the hot plate to 180° C. to remove the solvent. Subsequently, the dish is heated for 30 minutes by setting the set temperature of the hot plate to 360° C. to decompose most of the organic components contained in the precursor solution 3Y by combustion. Thereafter, heating is performed for 1 hour by setting the set temperature of the hot plate to, for example, 540° C. as the first heating treatment. By doing this, the organic components remaining in the precursor solution 3Y are burned and decomposed, whereby a calcined body is obtained.

Subsequently, the calcined body is ground and mixed. More particularly, the calcined body is sufficiently ground and mixed to form a powder using an agate mortar and an agate pestle. At that time, the average particle diameter of the ground and mixed calcined body is preferably set to 0.1 μm or more and 5 μm or less, and is more preferably 0.3 μm or more and 1 μm or less. By adjusting the average particle diameter, in the below-mentioned second heating treatment, synthesis from the calcined body to the solid electrolyte 3b is accelerated. The average particle diameter can be measured in the same manner as the average particle diameter of the active material 2b described above.

Subsequently, the calcined body is molded. More particularly, the powder of the calcined body is pressed with a pressure of 0.624 kN/mm$^2$ (624 MPa) for 5 minutes using a die with an exhaust port having an inner diameter of 10 mm as a molding die, whereby a circular disk-shaped molded material of the calcined body is produced. The shape of the circular disk-shaped molded material is not particularly limited, but is set to, for example, 10 mm in diameter, 8 mm in effective diameter, and 150 μm in thickness.

Subsequently, the circular disk-shaped molded material of the calcined body is subjected to the second heating treatment. More particularly, the second heating treatment may be performed by placing the circular disk-shaped molded material in a crucible with a lid through a support, and placing the molded material in an electric muffle furnace together with the crucible. The crucible is, for example, made of magnesium oxide. Note that the first heating treatment and the second heating treatment may be performed in a dry atmosphere or in an oxidative atmosphere. By doing this, a pellet of the solid electrolyte 3b that is the garnet-type solid electrolyte of the compositional formula (1) or the compositional formula (2) is formed. Then, the process proceeds to Step S23.

In Step S23, the pellet of the solid electrolyte 3b is ground and mixed. More particularly, the pellet of the solid electrolyte 3b is sufficiently ground and mixed to form a powder using an agate mortar and an agate pestle. At that time, the average particle diameter of the ground and mixed solid electrolyte 3b is preferably set to 0.1 μm or more and 5 μm or less, and is more preferably 0.3 m or more and 1 μm or less. By adjusting the average particle diameter, when the positive electrode 9 is formed from a slurry, dispersion of the active material 2b and the solid electrolyte 3b is accelerated. The average particle diameter of the powder of the solid electrolyte 3b can be measured in the same manner as the average particle diameter of the active material 2b described above. Then, the process proceeds to Step S24.

In Step S24, a slurry is produced from the powder of the solid electrolyte 3b, the active material 2b, and a solvent. First, the active material 2b is prepared. In this embodiment, the active material 2b is obtained in the same manner as in Step S12 of the first embodiment using lithium cobalt oxide ($LiCoO_2$) that is a lithium composite metal oxide as the active material 2b that is the forming material of the active material portion 2.

Subsequently, a slurry is produced from the powder of the solid electrolyte 3b, the active material 2b, and a solvent. As the solvent, water or the organic solvent used in the metal compound solutions in the first embodiment can be adopted.

Specifically, for example, in a beaker made of Pyrex, the powder of the solid electrolyte 3b, the active material 2b, a solvent, and a magnetic stirring bar are placed and mixed while stirring using a magnetic stirrer. By doing this, a slurry that is a mixture of the powder of the solid electrolyte 3b, the active material 2b, and the solvent is obtained. Then, the process proceeds to Step S25.

In Step S25, the slurry is coated onto a base material such as a film and molded into a sheet shape using a coating machine such as a bar coater. At that time, the thickness of the sheet is adjusted so that the thickness of the positive electrode 9 as a composite to be formed finally becomes 30 µm or more and 150 µm or less. The thickness can be appropriately changed in correspondence with the solid content concentration in the slurry, the performance of the coating machine, or the like.

Subsequently, the sheet is heated together with the base material, thereby evaporating the solvent contained in the slurry. The heating temperature at that time is appropriately set according to the boiling point or vapor pressure of the solvent, or the like. Thereafter, the sheet is detached from the base material and processed into a molded body having a desired shape, for example, a circular disk shape having a diameter of about 8.4 mm. Then, the process proceeds to Step S26.

In Step S26, the molded body is subjected to a third heating treatment. The conditions of the third heating treatment are such that the heating temperature is 800° C. or higher and 1000° C. or lower, and the heating time is 4 hours or more and 10 hours or less. By the third heating treatment, the positive electrode 9 as a composite including the electrolyte portion 3 composed of the solid electrolyte 3b and the active material portion 2 composed of the active material 2b is obtained from the solid electrolyte 3b and the active material 2b.

Note that the third heating treatment may be performed by placing the molded body in a crucible with a lid through a support and placing the molded body in an electric muffle furnace or the like together with the crucible. The crucible is, for example, made of magnesium oxide. Note that the third heating treatment may be performed in a dry atmosphere or in an oxidative atmosphere. Then, the process proceeds to Step S27. Step S27 to Step S29 are performed in the same manner as Step S15 to Step S17 in the method for producing the lithium-ion battery 100 in the first embodiment as described above. According to this, the lithium-ion battery of the second embodiment is obtained.

As described above, with the use of the method for producing a lithium-ion battery according to the second embodiment, the same effects as those of the first embodiment can be obtained.

3. First Modification

The battery to which the solid electrolyte 3b formed using the precursor solution of a solid electrolyte of this embodiment is applied is not limited to the lithium-ion battery 100 of the above-mentioned embodiment. For example, the battery may have a configuration in which a porous separator is provided between the positive electrode 9 as a composite and the negative electrode 30, and the separator is impregnated with an electrolytic solution. Further, for example, the negative electrode 30 may be a negative electrode as a composite including a negative electrode active material and the solid electrolyte 3b. In addition, for example, a configuration in which the electrolyte layer 20 composed of the solid electrolyte 3b of this embodiment is provided between the positive electrode 9 and the negative electrode as a composite may be adopted.

4. Second Modification

4.1. Electronic Apparatus

Figure 10:
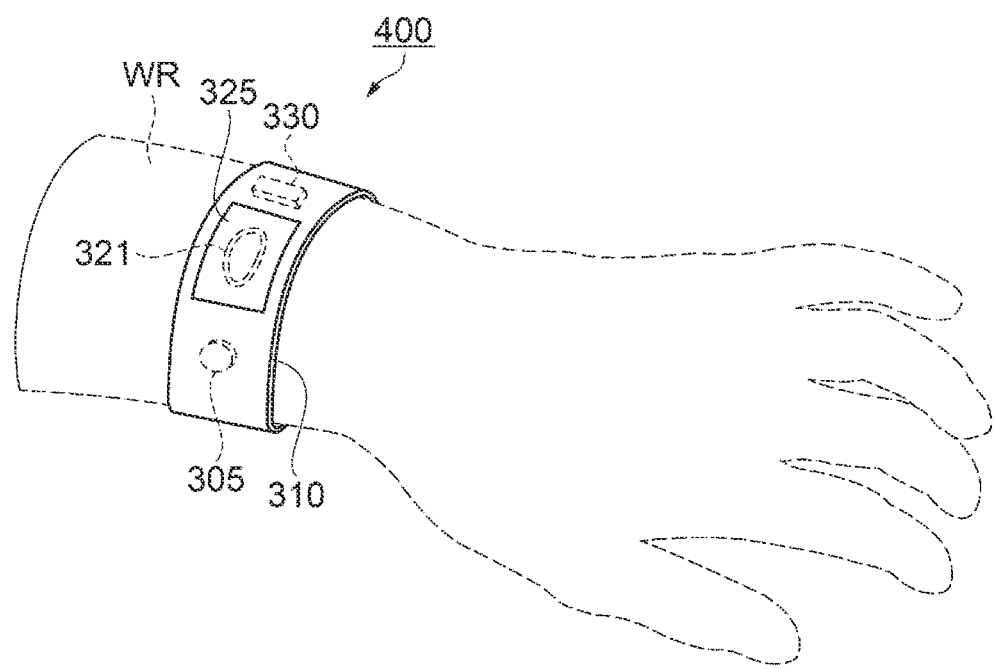
FIG. 10 is a schematic view showing a configuration of a wearable apparatus according to a second modification.

As a second modification, an electronic apparatus to which a battery including the solid electrolyte of the above-mentioned embodiment is applied will be described with reference to FIG. 10. In this modification, a wearable apparatus will be described as an example of the electronic apparatus. FIG. 10 isaschematic view showing a configuration of a wearable apparatus as the electronic apparatus according to the second modification.

As shown in FIG. 10, a wearable apparatus 400 of this modification is an information apparatus that is worn on, for example, the wrist WR of a human body using a band 310 like a watch, and that obtains information related to the human body. The wearable apparatus 400 includes a battery 305, a display portion 325, a sensor 321, and a processing portion 330. As the battery 305, the lithium-ion battery of the above-mentioned embodiment is used.

The band 310 has a belt-like shape using a resin having flexibility such as rubber so as to come into close contact with the wrist WR when it is worn. In an end portion of the band 310, a binding portion (not shown) capable of adjusting the binding position according to the thickness of the wrist WR is provided.

The sensor 321 is disposed in the band 310 at the wrist WR side that is an inner face side of the band 310 so as to come into contact with the wrist WR when it is worn. The sensor 321 obtains information on the pulse rate, the blood glucose level, or the like of the human body when it comes into contact with the wrist WR, and outputs the information to the processing portion 330. As the sensor 321, for example, an optical sensor is used.

The processing portion 330 is incorporated in the band 310, and is electrically coupled to the sensor 321 and the display portion 325. As the processing portion 330, for example, an integrated circuit is used. The processing portion 330 performs arithmetic processing of the pulse rate, the blood glucose level, or the like based on the output from the sensor 321, and outputs display data to the display portion 325.

The display portion 325 displays the display data such as the pulse rate or the blood glucose level output from the processing portion 330. As the display portion 325, for example, a light-receiving type liquid crystal display device is used. The display portion 325 is disposed at an outer face side of the band 310, in other words, at a side opposite to the inner face at which the sensor 321 is disposed so that a wearer can read the display data when the wearer wears the wearable apparatus 400.

The battery 305 functions as a power supply source that supplies electric power to the display portion 325, the sensor 321, and the processing portion 330. The battery 305 is incorporated in the band 310.

According to the above configuration, the wearable apparatus 400 can obtain information on the pulse rate or the blood glucose level of a wearer from the wrist WR and can display it as information such as the pulse rate or the blood glucose level through arithmetic processing or the like. Further, to the wearable apparatus 400, the lithium-ion battery including the solid electrolyte of the above-mentioned embodiment having an improved lithium ion conduction property and a large battery capacity in spite of being small in size is applied, and therefore, the weight can be reduced, and the operating time can be extended. In addition, since the lithium-ion battery of the above-mentioned embodiment is an all-solid-state secondary battery, the battery can be repeatedly used by charging, and also there is no concern about leakage of an electrolytic solution or the like, and therefore, the wearable apparatus 400 that can be used stably for a long period of time can be provided.

In this modification, a watch-type wearable apparatus is illustrated as the wearable apparatus 400, however, the apparatus is not limited thereto. The wearable apparatus may be a wearable apparatus to be worn on, for example, the ankle, head, ear, waist, or the like.

Further, the electronic apparatus to which the battery 305, that is, the lithium-ion battery of the above-mentioned embodiment is applied as the power supply source is not limited to the wearable apparatus 400. As other electronic apparatuses, for example, a display to be worn on the head such as a head-mounted display, a head-up display, a portable telephone, a portable information terminal, a notebook personal computer, a digital camera, a video camera, a music player, a wireless headphone, a portable gaming machine, and the like are exemplified. These electronic apparatuses may have another function, for example, a data communication function, a gaming function, a recording and playback function, a dictionary function, or the like.

Further, the electronic apparatus of this modification is not limited to those for general consumers, and can also be applied to industrial use. In addition, the apparatus to which the lithium-ion battery of the above-mentioned embodiment is applied is not limited to electronic apparatuses. For example, the lithium-ion battery of the above-mentioned embodiment may be applied as a power supply source for a moving object. Specific examples of the moving object include automobiles such as HEV (Hybrid Electric Vehicle), PHEV (Plug-in Hybrid Electric Vehicle), EV (Electric Vehicle), and FCV (Fuel Cell Vehicle), electric motorcycles, electric bicycles, electric wheelchairs, forklifts, and flying objects such as unmanned planes. According to this, a moving object including a battery having an improved lithium ion conduction property as a power supply source can be provided.

Hereinafter, contents derived from the embodiments will be described.

A precursor solution of a garnet-type solid electrolyte is a precursor solution of a garnet-type solid electrolyte represented by the following compositional formula, and contains one type of solvent, and a lithium compound, a lanthanum compound, a zirconium compound, a gallium compound, and a neodymium compound, each of which has solubility in the solvent, wherein with respect to the stoichiometric composition of the following compositional formula, the amount of the lithium compound is 1.05 times or more and 1.30 times or less, and the amounts of the lanthanum compound, the zirconium compound, the gallium compound, and the neodymium compound are equal.

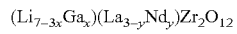

$(Li_{7-3x}Ga_x)(La_{3-y}Nd_y)Zr_2O_{12}$

Provided that the following relationships are satisfied: $0.1 \leq x \leq 1.0$ and $0.0 < y \leq 0.2$.

According to this configuration, in the garnet-type solid electrolyte represented by the above compositional formula, the lithium ion conduction property can be improved. More particularly, the precursor solution contains only a single type of solvent as the solvent. Therefore, when the solvent is evaporated, the deposition of the metals contained is more likely to uniformly proceed as compared to a case where multiple solvents are contained. In the solid electrolyte, when the deposition of the constituent metals uniformly proceeds, a byproduct is less likely to be generated, and a non-uniform region is less likely to occur. Accordingly, the lithium ion conduction property of the solid electrolyte is improved. Therefore, the precursor solution of the garnet-type solid electrolyte that improves the lithium ion conduction property can be provided.

In the precursor solution of a garnet-type solid electrolyte described above, it is preferred that the zirconium compound is a zirconium alkoxide, the lithium compound is a lithium metal salt compound, the lanthanum compound is a lanthanum metal salt compound, the gallium compound is a gallium metal salt compound, and the neodymium compound is a neodymium metal salt compound.

According to this configuration, when a zirconium alkoxide is used, in a case where a lithium-ion battery is produced by a liquid-phase method using the precursor solution and the positive electrode active material, a relatively homogeneous solid electrolyte film is formed at the surface of the positive electrode active material.

Further, when metal salt compounds are used, in a case where a lithium-ion battery is produced by a liquid-phase method using the precursor solution and the positive electrode active material, an interface between the positive electrode active material and the solid electrolyte is formed in a relatively well-organized manner. Due to this, the interface between the solid electrolyte composed of the precursor solution and the positive electrode active material is favorably formed, and lithium ions are favorably transferred. That is, in the lithium-ion battery including a composite electrode composed of the solid electrolyte and the positive electrode active material, the battery characteristics can be improved.

In the precursor solution of a garnet-type solid electrolyte described above, it is preferred that the lithium metal salt compound, the lanthanum metal salt compound, the gallium metal salt compound, and the neodymium metal salt compound are nitrates.

According to this configuration, the nitrate acts as a melt, and when a lithium-ion battery is produced by a liquid-phase method using the precursor solution and the positive electrode active material, the interface between the positive electrode active material and the solid electrolyte is formed in a more organized manner. Accordingly, the battery characteristics of the lithium-ion battery can be further improved.

In the precursor solution of a garnet-type solid electrolyte described above, it is preferred that the zirconium alkoxide has 4 or more and 8 or less carbon atoms or has a boiling point of 300° C. or higher.

According to this configuration, the occurrence of hydrolysis in the zirconium alkoxide is suppressed. That is, the pot life of the precursor solution of the garnet-type solid electrolyte can be extended as compared to a case where the zirconium alkoxide has less than 4 or more than 8 carbon atoms or has a boiling point lower than 300° C.

A precursor solution of a garnet-type solid electrolyte is a precursor solution of a garnet-type solid electrolyte represented by the following compositional formula, and contains one type of solvent, and a lithium compound, a lanthanum compound, a zirconium compound, a gallium compound, and a calcium compound, each of which has solubility in the solvent, wherein with respect to the stoichiometric composition of the following compositional formula, the amount of the lithium compound is 1.05 times or more and 1.30 times or less, and the amounts of the lanthanum compound, the zirconium compound, the gallium compound, and the calcium compound are equal.

$$(Li_{7-3x+y}Ga_x)(La_{3-y}Ca_y)Zr_2O_{12}$$

Provided that the following relationships are satisfied: $0.1 \leq x \leq 1.0$ and $0.0 < y \leq 0.2$.

According to this configuration, in the garnet-type solid electrolyte represented by the above compositional formula, the lithium ion conduction property can be improved. More particularly, the precursor solution contains only a single type of solvent as the solvent. Therefore, when the solvent is evaporated, the deposition of the metals contained is more likely to uniformly proceed as compared to a case where multiple solvents are contained. In the solid electrolyte, when the deposition of the constituent metals uniformly proceeds, a byproduct is less likely to be generated, and a non-uniform region is less likely to occur. Accordingly, the lithium ion conduction property of the solid electrolyte is improved.

Further, when the content of the lithium compound is 1.05 times or more and 1.30 times or less with respect to the stoichiometric composition of the following compositional formula, lithium volatilized in the firing step for forming the solid electrolyte is compensated. Therefore, it becomes easy to obtain the desired garnet-type solid electrolyte of the above compositional formula, and the lithium ion conduction property can be further improved. Accordingly, the precursor solution of the garnet-type solid electrolyte that improves the lithium ion conduction property can be provided.

In the precursor solution of a garnet-type solid electrolyte described above, it is preferred that the zirconium compound is a zirconium alkoxide, the lithium compound is a lithium metal salt compound, the lanthanum compound is a lanthanum metal salt compound, the gallium compound is a gallium metal salt compound, and the calcium compound is a calcium metal salt compound.

According to this configuration, when a zirconium alkoxide is used, in a case where a lithium-ion battery is produced by a liquid-phase method using the precursor solution and the positive electrode active material, a relatively homogeneous solid electrolyte film is formed at the surface of the positive electrode active material.

Further, when metal salt compounds are used, in a case where a lithium-ion battery is produced by a liquid-phase method using the precursor solution and the positive electrode active material, an interface between the positive electrode active material and the solid electrolyte is formed in a relatively well-organized manner. Due to this, the interface between the solid electrolyte composed of the precursor solution and the positive electrode active material is favorably formed, and lithium ions are favorably transferred. That is, in the lithium-ion battery including a composite electrode composed of the solid electrolyte and the positive electrode active material, the battery characteristics can be improved.

In the precursor solution of a garnet-type solid electrolyte described above, it is preferred that the lithium metal salt compound, the lanthanum metal salt compound, the gallium metal salt compound, and the calcium metal salt compound are nitrates.

According to this configuration, the nitrate acts as a melt, and when a lithium-ion battery is produced by a liquid-phase method using the precursor solution and the positive electrode active material, the interface between the positive electrode active material and the solid electrolyte is formed in a more organized manner. Accordingly, the battery characteristics of the lithium-ion battery can be further improved.

In the precursor solution of a garnet-type solid electrolyte described above, it is preferred that the zirconium alkoxide has 4 or more and 8 or less carbon atoms or has a boiling point of 300° C. or higher.

According to this configuration, the occurrence of hydrolysis in the zirconium alkoxide is suppressed. That is, the pot life of the precursor solution of the garnet-type solid electrolyte can be extended as compared to a case where the zirconium alkoxide has less than 4 or more than 8 carbon atoms and also has a boiling point lower than 300° C.

In the precursor solution of a garnet-type solid electrolyte described above, it is preferred that the solvent is any of n-butyl alcohol, 2-n-butoxyethanol, 1,3-butanediol, 1,5-pentanediol, 1,2-hexanediol, 1,7-heptanediol, toluene, o-xylene, p-xylene, hexane, heptane, and octane.

According to this configuration, when a lithium-ion battery is produced by a liquid-phase method using the precursor solution and the positive electrode active material, erosion of the surface of the positive electrode active material by the solvent in the precursor solution can be suppressed. More particularly, since the solvent is a neutral solvent, an erosive action is less likely to occur on the lithium composite metal oxide or the like that is the positive electrode active material as compared to an acidic or basic solvent. Therefore, erosion of the surface of the positive electrode active material is suppressed, and lithium ions are favorably transferred between the solid electrolyte composed of the precursor solution and the positive electrode active material. That is, the battery characteristics of the lithium-ion battery can be improved.

In a method for producing a precursor solution of a garnet-type solid electrolyte, the precursor solution of a garnet-type solid electrolyte described above is produced by performing a step of preparing multiple types of metal compound solutions by mixing metal compounds containing elements constituting the precursor solution and a solvent, a step of preparing a mixed solution by mixing the multiple types of metal compound solutions, and a solvent removal treatment for the mixed solution.

According to this configuration, the precursor solution of a garnet-type solid electrolyte described above that improves the lithium ion conduction property can be produced.

A garnet-type solid electrolyte is produced using the precursor solution of a garnet-type solid electrolyte described above.

According to this configuration, a garnet-type solid electrolyte in which the lithium ion conduction property is improved can be obtained.

The invention claimed is:

1. A precursor solution of a solid electrolyte, which is a precursor solution of a garnet-type solid electrolyte represented by the following compositional formula, comprising:
   one type of solvent; and
   a lithium compound, a lanthanum compound, a zirconium compound, a gallium compound, and a neodymium compound, each of which has solubility in the solvent, wherein
   with respect to the stoichiometric composition of the following compositional formula,
   the amount of the lithium compound is 1.05 times or more and 1.30 times or less, and
   the amounts of the lanthanum compound, the zirconium compound, the gallium compound, and the neodymium compound are equal:

$$(Li_{7-3x}Ga_x)(La_{3-y}Nd_y)Zr_2O_{12}$$

provided that the following relationships are satisfied: $0.1 \leq x \leq 1.0$ and $0.0 < y \leq 0.2$.

2. The precursor solution of a solid electrolyte according to claim 1, wherein the zirconium compound is a zirconium alkoxide, the lithium compound is a lithium metal salt compound, the lanthanum compound is a lanthanum metal salt compound, the gallium compound is a gallium metal salt compound, and the neodymium compound is a neodymium metal salt compound.

3. The precursor solution of a solid electrolyte according to claim 2, wherein the lithium metal salt compound, the lanthanum metal salt compound, the gallium metal salt compound, and the neodymium metal salt compound are nitrates.

4. The precursor solution of a solid electrolyte according to claim 2, wherein the zirconium alkoxide has 4 or more and 8 or less carbon atoms or has a boiling point of 300° C. or higher.

5. The precursor solution of a solid electrolyte according to claim 1, wherein the solvent is any of n-butyl alcohol, 2-n-butoxyethanol, 1,3-butanediol, 1,5-pentanediol, 1,2-hexanediol, 1,7-heptanediol, toluene, o-xylene, p-xylene, hexane, heptane, and octane.

6. A method for producing a precursor solution of a garnet-type solid electrolyte, in which the precursor solution of a garnet-type solid electrolyte according to claim 1 is produced by performing a step of preparing multiple types of metal compound solutions by mixing metal compounds containing elements constituting the precursor solution and a solvent, a step of preparing a mixed solution by mixing the multiple types of metal compound solutions, and a solvent removal treatment for the mixed solution.

7. A garnet-type solid electrolyte, produced using the precursor solution of a garnet-type solid electrolyte according to claim 1.

8. The precursor solution of a solid electrolyte according to claim 3, wherein the zirconium alkoxide has 4 or more and 8 or less carbon atoms or has a boiling point of 300° C. or higher.

* * * * *